US012671936B2

(12) United States Patent
Shin et al.

(10) Patent No.: US 12,671,936 B2
(45) **Date of Patent: *Jun. 30, 2026**

(54) VIBRATION APPARATUS

(71) Applicant: LG Display Co., Ltd., Seoul (KR)

(72) Inventors: JaeMin Shin, Paju-si (KR); ChanHeon Lee, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 155 days.

This patent is subject to a terminal disclaimer.

(21) Appl. No.: 18/676,211

(22) Filed: May 28, 2024

(65) Prior Publication Data

US 2024/0314492 A1 Sep. 19, 2024

Related U.S. Application Data

(63) Continuation of application No. 18/136,781, filed on Apr. 19, 2023, now Pat. No. 12,028,676, which is a continuation of application No. 17/529,244, filed on Nov. 17, 2021, now Pat. No. 11,665,467, which is a continuation of application No. 17/126,870, filed on Dec. 18, 2020, now Pat. No. 11,223,896, which is a (Continued)

(30) Foreign Application Priority Data

Sep. 20, 2018 (KR) ........................ 10-2018-0113072

(51) Int. Cl.

| | |
|---|---|
| ***H04R 17/00*** | (2006.01) |
| ***H04R 1/02*** | (2006.01) |
| ***H04R 1/28*** | (2006.01) |

(52) U.S. Cl.

CPC ........... *H04R 1/2811* (2013.01); *H04R 1/025* (2013.01); *H04R 17/00* (2013.01); *H04R 2499/15* (2013.01)

(58) Field of Classification Search

CPC ...... H04R 1/2811; H04R 1/025; H04R 17/00; H04R 2499/15

See application file for complete search history.

(56) References Cited

U.S. PATENT DOCUMENTS

| | | | |
|---|---|---|---|
| 6,137,890 | A | 10/2000 | Markow |
| 10,200,772 | B2 | 2/2019 | Ahn et al. |
| 10,911,862 | B2 | 2/2021 | Shin et al. |

(Continued)

FOREIGN PATENT DOCUMENTS

| | | | |
|---|---|---|---|
| CN | 1802032 | A | 7/2006 |
| CN | 1812665 | A | 8/2006 |

(Continued)

OTHER PUBLICATIONS

Office Action dated Nov. 5, 2021, issued in corresponding Chinese Patent Application No. 201910734596.0.

(Continued)

*Primary Examiner* — Suhan Ni

(74) *Attorney, Agent, or Firm* — Morgan, Lewis & Bockius LLP

(57) ABSTRACT

A display apparatus includes: a display module including a display panel configured to display an image, a vibration plate on a rear surface of the display module, a connection member between the rear surface of the display module and the vibration plate, at least one vibration module on the vibration plate, and an enclosure between the display module and the vibration plate, the enclosure being spaced apart from the vibration module, the enclosure surrounding the vibration module.

21 Claims, 12 Drawing Sheets

Related U.S. Application Data continuation of application No. 16/534,454, filed on Aug. 7, 2019, now Pat. No. 10,911,862.

(56) References Cited

U.S. PATENT DOCUMENTS

| | | | |
|---|---|---|---|
| 11,223,896 | B2 | 1/2022 | Shin et al. |
| 2004/0246109 | A1 | 12/2004 | Suzuki et al. |
| 2006/0140438 | A1 | 6/2006 | Kimura et al. |
| 2006/0140439 | A1 | 6/2006 | Nakagawa |
| 2006/0159293 | A1 | 7/2006 | Azima et al. |
| 2010/0067726 | A1 | 3/2010 | Suzuki et al. |
| 2011/0200195 | A1 | 8/2011 | Lau et al. |
| 2012/0162143 | A1 | 6/2012 | Kai et al. |
| 2013/0335210 | A1 | 12/2013 | Arai et al. |
| 2014/0153213 | A1 | 6/2014 | Oh et al. |
| 2014/0160040 | A1 | 6/2014 | Kang et al. |
| 2015/0010187 | A1 | 1/2015 | Lee et al. |
| 2015/0023531 | A1 | 1/2015 | Horii et al. |
| 2015/0078604 | A1 | 3/2015 | Seo et al. |
| 2015/0185963 | A1 | 7/2015 | Lee et al. |
| 2015/0341714 | A1 | 11/2015 | Ahn et al. |
| 2016/0050472 | A1 | 2/2016 | Lee et al. |
| 2017/0094380 | A1 | 3/2017 | Rittenhouse |
| 2017/0105294 | A1 | 4/2017 | Shimoda et al. |
| 2017/0127166 | A1 | 5/2017 | Noma |
| 2017/0280234 | A1 | 9/2017 | Choi et al. |
| 2018/0180939 | A1 | 6/2018 | Kim et al. |
| 2018/0332400 | A1 | 11/2018 | Chen |
| 2019/0025922 | A1 | 1/2019 | Lu et al. |
| 2019/0028787 | A1 | 1/2019 | Masuda et al. |
| 2019/0098411 | A1 | 3/2019 | Ham et al. |
| 2019/0182573 | A1 | 6/2019 | Shin et al. |
| 2020/0264702 | A1 | 8/2020 | Park et al. |

FOREIGN PATENT DOCUMENTS

| | | | |
|---|---|---|---|
| CN | 103852927 | A | 6/2014 |
| CN | 103869523 | A | 6/2014 |
| CN | 203747995 | U | 7/2014 |
| CN | 204031381 | U | 12/2014 |
| CN | 104282232 | A | 1/2015 |
| CN | 105096778 | A | 11/2015 |
| CN | 107454512 | A | 12/2017 |
| CN | 206993387 | U | 2/2018 |
| CN | 207150818 | U | 3/2018 |
| CN | 108124224 | A | 6/2018 |
| CN | 108227295 | A | 6/2018 |
| EP | 3 330 780 | A1 | 6/2018 |
| EP | 3 331 251 | A1 | 6/2018 |
| EP | 3 499 337 | A1 | 6/2019 |
| JP | S61-40099 | U | 3/1986 |
| JP | 2015-219528 | A | 12/2015 |
| KR | 10-2015-0031641 | A | 3/2015 |
| KR | 10-2016-0021941 | A | 2/2016 |
| KR | 10-1623749 | B1 | 5/2016 |
| KR | 10-2017-0076548 | A | 7/2017 |
| KR | 10-1780297 | B1 | 10/2017 |
| TW | 201821870 | A | 6/2018 |
| WO | 2012/114772 | A1 | 8/2012 |
| WO | 2018123310 | A1 | 7/2018 |

OTHER PUBLICATIONS

Manufacturing Method of Bobbin Combination MG Diaphragm;. KR 20100090750 A; Lee et al. Aug. 17, 2010.

Office Action dated Oct. 25, 2024 issued in corresponding Chinese Patent Application No. 202210809839.4. (Note: WO 2018/123310 A1, US 2014/0160040 A1, CN 103869523 A, and US 2017/0127166 A1 cited in this CN Office Action were cited in prior IDSs).

Office Action dated Sep. 28, 2022, issued in corresponding Korean Patent Application No. 10-2018-0113072.

European Search Report dated Feb. 13, 2020, issued in corresponding European Patent Application No. 19190733.6.

Office Action dated Jan. 26, 2024 issued in corresponding Chinese Patent Application No. 202210809839.4. (Note: WO 2018/123310 A1, US 2014/0160040 A1, CN 103869523 A, CN 207150818 U, US 2015/0341714 A1, CN 108124224 A, CN 103852927 A, and US 2012/0162143 A1 were previously cited).

European Search Report dated Jun. 5, 2020, issued in corresponding European Patent Application No. 19190733.6.

Office Action dated Mar. 30, 2021, issued in corresponding Chinese Patent Application No. 201910734596.0.

VIBRATION APPARATUS

CROSS-REFERENCE TO RELATED APPLICATION(S)

This application is a continuation of co-pending U.S. patent application Ser. No. 18/136,781, filed on Apr. 19, 2023, which is a continuation of U.S. patent application Ser. No. 17/529,244, filed on Nov. 17, 2021, which is a continuation of U.S. patent application Ser. No. 17/126,870, filed on Dec. 18, 2020, now U.S. Pat. No. 11,223,896, which is a continuation of U.S. patent application Ser. No. 16/534,454, filed on Aug. 7, 2019, now U.S. Pat. No. 10,911,862, which claims the benefit of and priority to Korean Patent Application No. 10-2018-0113072, filed on Sep. 20, 2018. The entirety of each of the above prior U.S. and Korean patent applications is hereby incorporated by reference.

BACKGROUND

1. Technical Field

The present disclosure relates to a display apparatus and a computing apparatus including the same.

2. Discussion of the Related Art

Generally, display apparatuses may be equipped in home appliances or electronic devices, such as televisions (TVs), monitors, notebook computers, smartphones, tablet computers, electronic organizers, electronic pads, wearable devices, watch phones, portable information devices, navigation devices, and automotive control display apparatuses, and are used as a screen for displaying an image. Display apparatuses may include a display panel for displaying an image and a sound device for outputting a sound associated with the image.

However, in display apparatuses, such as TVs and monitors, because a sound output from a sound device may travel toward a rearward or a downward direction of the display apparatus, sound quality may be degraded due to interference between sound reflected from a wall and the ground. As such, an immersion experience of a viewer may be reduced.

Moreover, in sound devices (or speakers) included in general computing apparatuses, such as notebook computers or tablet computers, it is difficult to realize high sound quality, and particularly, a base sound of a low-pitched sound is not sufficient. Also, as system bodies are reduced in weight and miniaturized, it is difficult to a low-pitched sound of about 1 kHz or less and a high-pitched sound of about 4 kHz or more. Furthermore, sound devices of general computing apparatuses are disposed on a lower side of a keyboard and a floor, a left side surface, and a right side surface of a body, and are spaced apart from a screen. As such, an immersion experience of a viewer is reduced due to a sense of difference (or mismatch) caused by a distance difference between an image and a sound. In other words, in speakers of general computing apparatuses, because an output direction of a sound is not a direction toward the ears of a viewer, a sound having a middle- or high-pitched sound band of about 2 kHz or more having strong linearity is not directly transferred to a viewer, and may be lost or distorted.

SUMMARY

Accordingly, the present disclosure is directed to a display apparatus and a computing apparatus including the same that substantially obviate one or more of the issues due to limitations and disadvantages of the related art.

An aspect of the present disclosure is to provide a display apparatus and a computing apparatus including the same that output sound using a vibration of a display module and/or a display panel.

Another aspect of the present disclosure is to provide a display apparatus and a computing apparatus including the same, in which a sound characteristic of a low-pitched sound band is improved.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts as embodied and broadly described, there is provided a display apparatus, including: a display module including a display panel configured to display an image, a vibration plate on a rear surface of the display module, a connection member between the rear surface of the display module and the vibration plate, at least one vibration module on the vibration plate, and an enclosure between the display module and the vibration plate, the enclosure being spaced apart from the at least one vibration module, the enclosure surrounding at least one the vibration module.

In another aspect, there is provided a computing apparatus, including: a system body, a display apparatus, including: a display module including a display panel configured to display an image, a vibration plate on a rear surface of the display module, a connection member between the rear surface of the display module and the vibration plate, a vibration module on the vibration plate, and an enclosure between the rear surface of the display module and the vibration plate, the enclosure being spaced apart from the vibration module, the enclosure surrounding the vibration module, and a hinge part between the system body and the display apparatus, the hinge part being configured to rotatably support the display apparatus.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with embodiments of the disclosure. It is to be understood that both the foregoing general description and the following detailed description of the present disclosure are examples and explanatory, and are intended to provide further explanation of the disclosure as claimed.

BRIEF DESCRIPTION OF THE DRAWINGS

The accompanying drawings, that may be included to provide a further understanding of the disclosure and are incorporated in and constitute a part of this specification, illustrate embodiments of the disclosure and together with the description serve to explain various principles of the disclosure.

Figure 1:
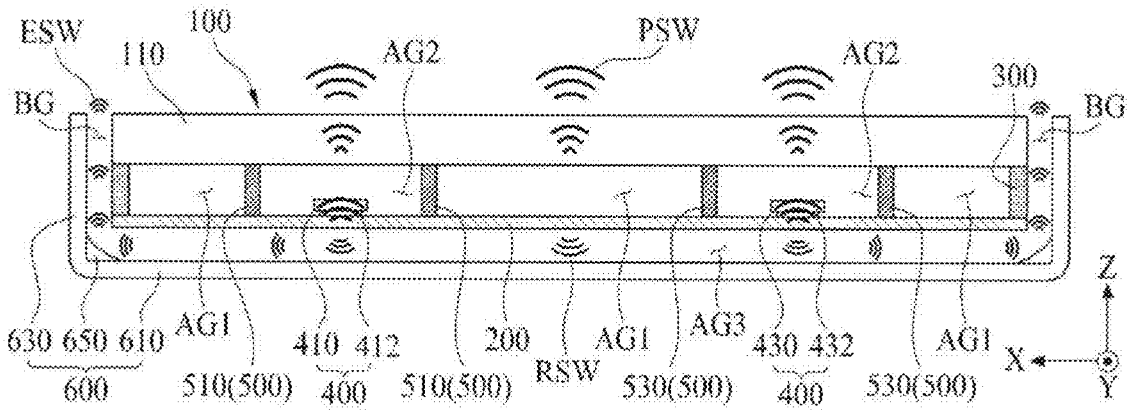
FIG. 1 is a cross-sectional view illustrating a display apparatus according to an embodiment of the present disclosure.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

Reference will now be made in detail to embodiments of the present disclosure, examples of which may be illustrated in the accompanying drawings. In the following description, when a detailed description of well-known functions or configurations related to this document is determined to unnecessarily cloud a gist of the inventive concept, the detailed description thereof will be omitted. The progression of processing steps and/or operations described is an example; however, the sequence of steps and/or operations is not limited to that set forth herein and may be changed as is known in the art, with the exception of steps and/or operations necessarily occurring in a particular order. Like reference numerals designate like elements throughout. Names of the respective elements used in the following explanations are selected only for convenience of writing the specification and may be thus different from those used in actual products.

It will be understood that, although the terms “first,” “second,” etc. May be used herein to describe various elements, these elements should not be limited by these terms. These terms are only used to distinguish one element from another. For example, a first element could be termed a second element, and, similarly, a second element could be termed a first element, without departing from the scope of the present disclosure.

The term “at least one” should be understood as including any and all combinations of one or more of the associated listed items. For example, the meaning of “at least one of a first item, a second item, and a third item” denotes the combination of all items proposed from two or more of the first item, the second item, and the third item as well as the first item, the second item, or the third item.

In the description of embodiments, when a structure is described as being positioned “on or above” or “under or below” another structure, this description should be construed as including a case in which the structures contact each other as well as a case in which a third structure is disposed therebetween. The size and thickness of each element shown in the drawings are given merely for the convenience of description, and embodiments of the present disclosure are not limited thereto.

Features of various embodiments of the present disclosure may be partially or overall coupled to or combined with each other, and may be variously inter-operated with each other and driven technically as those skilled in the art can sufficiently understand. Embodiments of the present disclosure may be carried out independently from each other, or may be carried out together in co-dependent relationship.

Hereinafter, a display apparatus and a computing apparatus including the same according to an embodiment of the present disclosure will be described in detail with reference to the accompanying drawings.

FIG. 1 is a cross-sectional view of a display apparatus according to an embodiment of the present disclosure.

With reference to FIG. 1, a display apparatus according to an embodiment of the present disclosure may include a display module 100, a vibration plate 200, a connection member 300, a vibration module 400, and an enclosure 500. The display module 100 may include a display panel 110 that may display an image. The display panel 110 may be configured to display the image via a front surface thereof. A rear surface of the display panel may be defined as a surface of the display panel opposite to the front surface thereof and/or facing away from the front surface thereof. The display module 100 according to an embodiment of the present disclosure may include a first rear region and a second rear region, which may be parallel to each other, and may be parallel to a rear middle portion. The first rear region, the second rear region and the rear middle portion may be included in a rear surface of the display module. The rear surface of the display module 100 may be defined as a surface of the display module opposite or facing away from the rear surface of the display module 100, which may correspond to a front surface of the display module 100. The front surface of the display module 100 may correspond to a front surface of the display panel 110. That is, the front surface of the display module 100 may correspond to a surface of the display module 100 via which an image may be displayed.

The display panel 110 may be any type of display panel, such as a liquid crystal display panel, a light-emitting display panel, an electrophoresis display panel, a micro light-emitting diode display panel, a plasma display panel, an electro wetting display panel, and a quantum dot light-emitting display panel. Hereinafter, for convenience of description, a liquid crystal display (LCD) apparatus including the display panel 110 or a light-emitting display apparatus including a light-emitting display panel will be described for example, but embodiments of the present disclosure are not limited thereto.

The vibration plate 200 may be coupled or connected to the display module 100 by the coupling or connection member 300. The vibration plate 200 according to an embodiment may be formed in a plate shape, including a metal material, and may face a rear surface of the display module 100. For example, the vibration plate 200 may have the same size as that of the rear surface of the display module 100, or may have a size that enables the vibration plate 200 to cover the whole rear surface of the display module 100. Similarly, a front surface of the vibration plate 200 may be defined as a surface of the vibration plate 200 facing the rear surface of the display module 100. A rear surface of the vibration plate 200 may be defined as a surface of the vibration plate 200 opposite to or facing away from the front surface of the vibration plate 200.

The vibration plate 200 according to an embodiment of the present disclosure may include one or more of: magnesium (Mg), aluminum (Al), an Al alloy material, a Mg alloy material, and a Mg-lithium (Li) alloy material. For example, the Mg alloy material may include one or more of: Al, zinc (Zn), and manganese (Mn). The Mg alloy material may be a very lightweight metal material of a mechanism structure, may have relatively high non-rigidity (intensity/specific gravity), and relatively high vibration-damping capacity (e.g., capacity to absorb and progressively reduce vibration), and may have good dimension stability with respect to a variation of a temperature and over time.

When the vibration plate 200 according to an embodiment of the present disclosure includes one of the above-described materials, a fine sound may be realized due to a reactivity (a response time) of a fast sound based on a density, and a sound having a whole sound band including a low-pitched sound band to a high-pitched sound band may be realized based on a fast sound speed due to high non-rigidity. Also, when internal loss is large due to high vibration-damping capacity, undesired vibration may not occur. Thus, a residual sound and a reflected sound or a resonance sound may be suppressed or reduced, thereby enabling an original sound to be reproduced or generated. Also, the vibration plate 200 may have high elasticity. Thus, a high-pitched sound of about 40 kHz or more may be realized.

The vibration plate 200 according to an embodiment of the present disclosure may be on the rear surface of the display module 100 with a first air gap AG1 therebetween by the coupling or connection member 300, and thus, may cover the rear surface of the display module 100, and may be spaced apart from the rear surface of the display module 100. For example, the vibration plate 200 may have a thickness of about 0.1 mm to 2.0 mm, e.g., for enhancing a sound of a high-pitched sound band. For example, if the thickness of the vibration plate 200 is less than 0.1 mm, it may be difficult to maintain flatness of the vibration plate 200, and the vibration plate 200 may be torn when vibrating. On the other hand, if the thickness of the vibration plate 200 is more than about 2.0 mm, the vibration plate 200 may be suitable for realizing a sound of a low-pitched sound band, rather than a sound of the high-pitched sound band.

The connection member 300 may be between the rear surface of the display module 100 and the vibration plate 200. Thus, the first air gap AG1 may be provided between the rear surface of the display module 100 and the vibration plate 200. For example, the first air gap AG1 may be a sealed space, sealed by the connection member 300, between the rear surface of the display module 100 and the vibration plate 200. That is, the connection member 300 may be between the rear surface of the display module 100 and a front surface of the vibration plate 200.

The connection member 300 may be between an edge or a periphery of the vibration plate 200 and a periphery of the rear surface of the display module 100. Thus, the vibration plate 200 may be fixed to the rear surface of the display module 100, and the first air gap AG1 may be provided between the rear surface of the display module 100 and the vibration plate 200. The first air gap AG1 may be a vibration space that may enable the vibration plate 200 to vibrate, and may enable the display module 100 to vibrate based on the vibration of the vibration plate 200.

The connection member 300 according to an embodiment of the present disclosure may include a double-sided adhesive tape and/or an adhesive resin. The double-sided adhesive tape may include a pad or a foam pad having a certain height (or a certain thickness). The adhesive resin may include an acryl-based material or a urethane-based material, but is not limited thereto. For example, to minimize or reduce a vibration of the vibration plate 200 directly transferred to the display module 100, the adhesive resin may include the urethane-based material having a relatively ductile characteristic rather than the acryl-based material.

The vibration module 400 may be on the vibration plate 200, and may vibrate according to a sound driving signal (or a vibration driving signal) input thereto to allow the vibration plate 200 to vibrate. The vibration module 400 may include a plurality of vibration-generating devices 410 and 430 respectively attached to or provided on the vibration plate 200 by first and second adhesive members 412 and 432. For example, the vibration module 400 may be on the front surface of the vibration plate 200.

The vibration module 400 may include a first vibration-generating device 410 and a second vibration-generating device 430. The first vibration-generating device 410 may be disposed in a first rear region of the display module 100. For example, the first vibration-generating device 410 may be attached to or provided on one side or portion of the vibration plate 200 overlapping the first rear region of the display module 100 by the first adhesive member 412. The second vibration-generating device 430 may be disposed in, or may correspond to, a second rear region of the display module 100. For example, the second vibration-generating device 430 may be attached to or provided on the other side or portion of the vibration plate 200 overlapping the second rear region of the display module 100 by the second adhesive member 432.

The first and second adhesive members 412 and 432 may each include a double-sided tape and/or a naturally-curable adhesive. The first and second adhesive members 412 and 432 may each include a thermocurable adhesive and/or a photocurable adhesive. For example, a characteristic of the first and second vibration-generating devices 410 and 430 may be reduced by heat used in a curing process of curing the first and second adhesive members 412 and 432.

Each of the first vibration-generating device 410 and the second vibration-generating device 430 according to an embodiment of the present disclosure may be disposed on a front surface of the vibration plate 200 to face the rear surface of the display module 100. For example, to reduce or prevent the rear surface of the display module 100 from physically contacting the first and second vibration-generating devices 410 and 430, which may vibrate based on the sound driving signal input thereto, the first and second vibration-generating devices 410 and 420 may be spaced apart from the rear surface of the display module 100 by a predetermined distance, and a distance between the display module 100 and each of the first and second vibration-generating devices 410 and 430 may be set based on a height (or a thickness) of the connection member 300. Therefore, the connection member 300 may have a height (or a thickness) that may be relatively greater than a distance between the front surface of the vibration plate 200 and a front surface of each of the first and second vibration-generating devices 410 and 430, with respect to a thickness direction Z of the display module 100, thereby preventing or reducing the first and second vibration-generating devices 410 and 430 from being damaged by direct physical contact between the display module 100 and each of the first and second vibration-generating devices 410 and 430.

The first vibration-generating device 410 and the second vibration-generating device 430 according to an embodiment of the present disclosure may each have a first length along a first direction X, and may each have a second length along a second direction Y intersecting the first direction X. For example, the first length of each of the first vibration-generating device 410 and the second vibration-generating device 430 may be shorter than the second length, but is not limited thereto. For example, the first length of each of the first vibration-generating device 410 and the second vibration-generating device 430 may be equal to or longer than the second length. The first direction may correspond to a width or a width direction of the display module and/or the display panel. The second direction may correspond to a height or a height direction of the display module and/or the display panel. In another example, each of the first vibration-generating device 410 and the second vibration-generating device 420 according to an embodiment of the present disclosure may be on a rear surface of the vibration plate 200 opposite to the front surface of the vibration plate 200.

Each of the first and second vibration-generating devices 410 and 430 according to an embodiment of the present disclosure may include a piezoelectric material layer having a piezoelectric effect, a first electrode on a front surface of the piezoelectric material layer, and a second electrode on a rear surface of the piezoelectric material layer. The piezoelectric material layer may include a piezoelectric material that may vibrate in accordance with an electric field. For example, the piezoelectric material may have a characteristic in which, as pressure is applied to or twisting occurs in a crystalline structure due to an external force, a potential difference may be caused by dielectric polarization based on a relative position change of a positive (+) ion and a negative (−) ion, and vibration may occur due to an electric field based on an applied voltage.

The piezoelectric material layer according to an embodiment of the present disclosure may include a polymer material-containing piezoelectric material, a thin-film material-containing piezoelectric material, a composite material-containing piezoelectric material, and/or a single crystalline ceramic or polycrystalline ceramic-containing piezoelectric material. Examples of the polymer material-containing piezoelectric material include poly vinylidene fluoride (PVDF), polyvinylidene fluoride trifluoroethylene P(VDF-TrFe), and P(VDFTeFE). Examples of the thin-film material-containing piezoelectric material include zinc oxide (ZnO), cadmium sulfide (CdS), and aluminum nitride (AlN). Examples of the composite material-containing piezoelectric material include lead zirconate titanate (PZT)-polyvinylidene fluoride (PVDF) (e.g., PZT-PVDF), PZT-silicon rubber, PZT-epoxy, PZT-foam polymer, and PZT-foam urethane. Examples of the single crystalline ceramic-containing piezoelectric material include one or more of: alpha-aluminum phosphate ($\alpha$-$AlPO_4$, berlinate), alpha-silicon dioxide ($\alpha$-$SiO_2$), lithium niobate ($LiNbO_3$), terbium molybdate ($Tb_2(MoO_4)_3$), lithium borate (or lithium tetraborate) ($Li_2B_4O_7$), and ZnO. Examples of the polycrystalline ceramic-containing piezoelectric material include a PZT-based material, a lead titanate (PT)-based material, a PZT-complex perovskite-based material, and barium titanate ($BaTiO_3$)).

The first electrode and the second electrode according to an embodiment of the present disclosure may overlap each other with the piezoelectric material layer therebetween. The first electrode and the second electrode may each include an opaque metal material that may be relatively low in resistance, and may have a good heat dissipation characteristic, but is not limited thereto. For example, the first electrode and the second electrode may each include a transparent conductive material and/or a conductive polymer material.

The first vibration-generating device 410 and the second vibration-generating device 420 may each have a relatively small area, and thus, may have a sound characteristic of the high-pitched sound band, thereby increasing a frequency characteristic of the high-pitched sound band and a sound pressure of the high-pitched sound band of a sound generated based on a vibration of the display module 100. For example, a frequency of the high-pitched sound band may be, for example, about 3 kHz or more, but is not limited thereto.

The enclosure 500 may be spaced apart from the vibration module 400, may be between the rear surface of the display module 100 and the vibration plate 200, and may surround the vibration module 400. Therefore, the enclosure 500 may provide a second air gap AG2 surrounding the vibration module 400 and/or may be included in the first air gap AG1 between the rear surface of the display module 100 and the vibration plate 200 provided by the connection member 300. For example, the second air gap AG2 may be a sealed space or a vibration space, sealed by the enclosure 500, between the rear surface of the display module 100 and the vibration plate 200, e.g., the front surface of the vibration plate 200, which may face each other with the vibration module 400 therebetween. The enclosure 500 may surround by the connection member 300.

The enclosure 500 according to an embodiment of the present disclosure may be a double-sided adhesive tape having a certain height (or a certain thickness). For example, the enclosure 500 may include one or more of: a double-sided tape, a double-sided adhesive pad, and a double-sided foam tape. One surface of the enclosure 500 may be attached to or provided on the rear surface of the display module 100, and the other surface of the enclosure 500 may be attached to or provided on the front surface of the vibration plate 200. The enclosure 500 according to an embodiment of the present disclosure may be near the vibration module 400, and may reduce or prevent or attenuate an undesired vibration of the vibration plate 200 caused by a vibration of the vibration module 400.

The vibration plate 200 may have a plate shape having a relatively wide size (or an area). Thus, a horizontal vibration or eccentrically vibration caused by a vibration of the vibration module 400 may occur. When a vibration signal of 1 kHz is input, a whole portion of the vibration plate 200 may vibrate at the same 1 kHz, but when the whole portion of the vibration plate 200 does not vibrate at the same frequency, the horizontal vibration may occur. The horizontal vibration may cause an undesired vibration of the vibration plate 200. When rub and buzz or noise occurs due to the horizontal vibration or the undesired vibration of the vibration plate 200, the total harmonic distortion (THD) of the vibration plate 200 may increase. For example, when the vibration plate 200 is vibrating, an excessive peak vibration may occur due to mutual overlapping in a peripheral region of the vibration module 400, or an excessive dip vibration may occur due to mutual offset, thereby decreasing a sound pressure characteristic and a sound quality characteristic.

The total harmonic distortion characteristic occurs when, due to a nonlinearity of a sound device such as a speaker, a signal that is not actually input appears in an output, and is a method of showing a nonlinearity of a sound device. For example, the total harmonic distortion characteristic occurs when a pure tone or a pure sound is input to a sound device, and a frequency that was not input appears in an output due to harmonic distortion in which harmonics corresponding to an integer multiple, such as two times, three times, and four times, of the pure sound appear in an output. The harmonic distortion may occur when a sound source signal equal to or greater than an input limit of a sound device is input, and a waveform may be clipped, and may occur when, as a harmonic component increases, a total harmonic distortion characteristic value increases, and distortion of a waveform may be severe.

The total harmonic distortion characteristic may be represented as a ratio of a sum of root mean square (RMS) values of total harmonics to an RMS value of a basis wave. For example, the total harmonic distortion characteristic may be represented as a rate (%) at which a frequency, other than 1 kHz, occurs when a vibration signal of 1 kHz is input. The total harmonic distortion characteristic may occur when, as a harmonic component increases, a high value is obtained. As a total harmonic distortion characteristic value increases, distortion of a waveform may be severe.

For example, when noise is in a sound source, the noise may be amplified along with the sound source when amplifying the sound source, and due to this, the total harmonic distortion characteristic may increase. When rub and buzz occur due to a vibration of the vibration plate 200, the total harmonic distortion characteristic may increase. As the total harmonic distortion characteristic increases, a ratio of an original sound may be reduced to cause distortion of the original sound or decrease a sound pressure characteristic and a sound quality characteristic. For example, when the display apparatus, which outputs a sound according to a vibration of the display module 100, has a total harmonic distortion characteristic of 5% or less in a sound band of about 2 kHz or more and has a total harmonic distortion characteristic of 15% or less in a sound band of less than about 2 kHz, a sound pressure characteristic and a sound quality characteristic may be enhanced.

The enclosure 500 according to an embodiment of the present disclosure may be in a horizontal vibration region of the vibration plate 200, and may surround the vibration module 400, and may act as a damper which prevents (or attenuates) a horizontal vibration (or an undesired vibration) of the vibration plate 200, thereby decreasing the total harmonic distortion characteristic of the vibration plate 200 to enhance the sound quality and sound pressure characteristic of the display apparatus. For example, a first distance between the enclosure 500 and each of the vibration-generating devices 410 and 430 may be a distance that may be one to three times the first length of each of the vibration-generating devices 410 and 430, with respect to the first direction X. Also, a second distance between the enclosure 500 and each of the vibration-generating devices 410 and 430 may be a distance that may be half (0.5) to 1.5 times the second length of each of the vibration-generating devices 410 and 430, with respect to the second direction Y.

The enclosure 500 according to an embodiment of the present disclosure may include a first enclosure 510 and a second enclosure 530. The first enclosure 510 may be between the rear surface of the display module 100 and the vibration plate 200, and may surround the first vibration-generating device 410, and may prevent or attenuate a horizontal vibration or an undesired vibration of the vibration plate 200 occurring near the first vibration-generating device 410. The second enclosure 530 may be between the rear surface of the display module 100 and the vibration plate 200, and may surround the second vibration-generating device 430, and may prevent or attenuate a horizontal vibration or an undesired vibration of the vibration plate 200 occurring near the second vibration-generating device 430.

The display apparatus according to an embodiment of the present disclosure may further include a system rear cover 600. The system rear cover 600 may accommodate the display module 100 and the vibration plate 200 coupled or connected to the vibration module 400. The system rear cover 600 may include a rear structure 610 and a side structure 630.

The rear structure 610, an outermost rear structure on a rear surface of the display apparatus, may support the display module 100, and may cover or overlap the rear surface of the vibration plate 200 with a third air gap AG3 therebetween. The side structure 630, an outermost side structure on a side surface of the display apparatus, may be provided on an edge or in a periphery of the rear structure 610, and may cover side surfaces of the display module 100 and side surfaces of the vibration plate 200 with a border gap BG therebetween.

The system rear cover 600 according to an embodiment of the present disclosure may further include a rear sound member 650. The rear sound member 650 may be in an inner corner portion of the system rear cover 600. For example, the rear sound member 650 may protrude from a corner portion of each of the rear structure 610 and the side structure 630, or may be installed in the corner portion of each of the rear structure 610 and the side structure 630. For example, the rear sound member 650 may be referred to as a "sound guide member," a "rear sound guide member," or a "rear sound guider," but the term is not limited thereto.

The rear sound member 650 according to an embodiment of the present disclosure may include an inclined surface or a curved surface, each facing the third air gap AG3 and the border gap BG. The rear sound member 650 may guide a traveling path of a rear sound, traveling toward the border gap BG via the third air gap AG3, in a direction toward a front surface of the display panel 110. For example, a rear sound RSW, which may be generated in the third air gap AG3 based on a vibration of the vibration plate 200, may be output in a direction toward the front surface of the display panel 110, and thus, may be an edge sound or periphery sound ESW.

The display apparatus according to an embodiment of the present disclosure may include the display module 100, which may vibrate based on a vibration of the vibration plate 200, which may perform based on a vibration of the vibration module 400 based on a sound driving signal input thereto. Thus, the display module 100 may output a first sound wave, e.g., a panel sound PSW, generated based on the vibration of the display module 100, toward a forward region in front of the display panel 110, thereby outputting a high-quality sound of a broad sound band, realizing a sound field that may fully fill a whole screen, and may enhance an immersion experience of a viewer due to harmony (or match) between an image and a sound.

Also, the display apparatus according to an embodiment of the present disclosure may include the enclosure 500, which may be near the vibration module 400 to prevent (or attenuate) a horizontal vibration of the vibration plate 200, which may vibrate based on a vibration of the vibration module 400. Thus, the total harmonic distortion characteristic of the vibration plate 200 may be reduced, thereby enhancing sound quality and a sound pressure characteristic.

Also, in the display apparatus according to an embodiment of the present disclosure, a first sound wave or panel sound PSW may be generated based on the vibration of the display module 100, and may be directly output toward the forward region in front of the display panel 110. Further, a second sound wave or rear sound (or a vibration sound of a vibration plate) or edge or periphery sound ESW may be generated based on the vibration of the vibration plate 200, and may be output toward the forward region in front of the display panel 110 via the third air gap AG3 and the border gap BG, instead of toward a rearward region behind and/or a downward region under the display panel 110, thereby accurately transferring a sound and improving sound quality to increase an immersion experience of a viewer. For example, a sound having a middle- or high-pitched sound band of about 2 kHz to 20 kHz may have a strong linearity. Thus, even when the sound is output toward the ears of a viewer, the sound may be transferred to the viewer without being lost or without the sound being distorted. However, a sound of the middle- or high-pitched sound band, which may be output from a lower speaker and/or a rear speaker equipped in a related art display apparatus, cannot be normally transferred to a viewer due to an output direction thereof.

On the other hand, in the display apparatus according to an embodiment of the present disclosure, when the panel sound PSW and the edge or periphery sound ESW, each traveling toward ears of a viewer, outputs toward the forward region in front of the display panel 110, a sound of the middle- or high-pitched sound band may be directly transferred to the viewer without being lost or distorted. Thus, a sound substantially similar to an original sound may be provided to the viewer.

Figure 2:
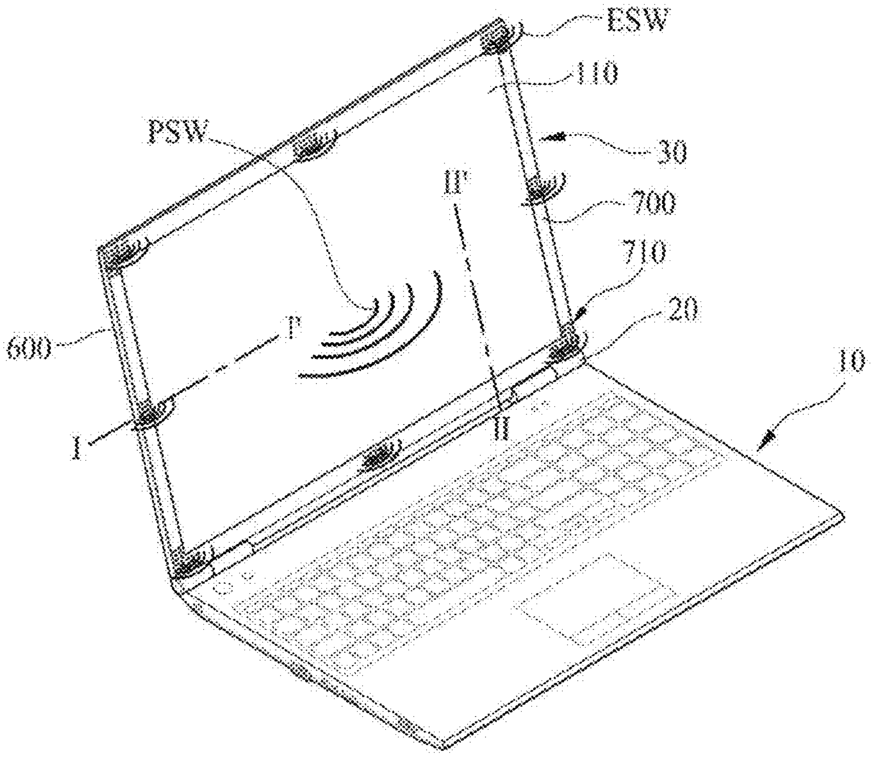
FIG. 2 illustrates a computing apparatus according to an embodiment of the present disclosure.
Figure 3:
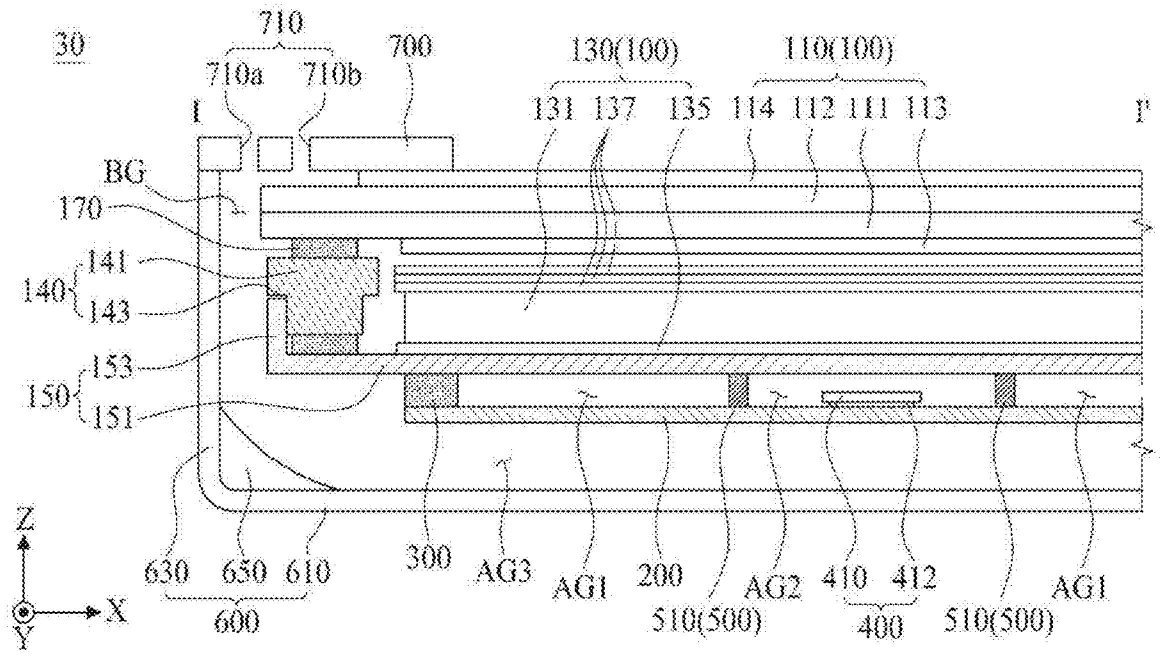
FIG. 3 is a cross-sectional view taken along line I-I' illustrated in FIG. 2 according to an embodiment of the present disclosure.
Figure 4:
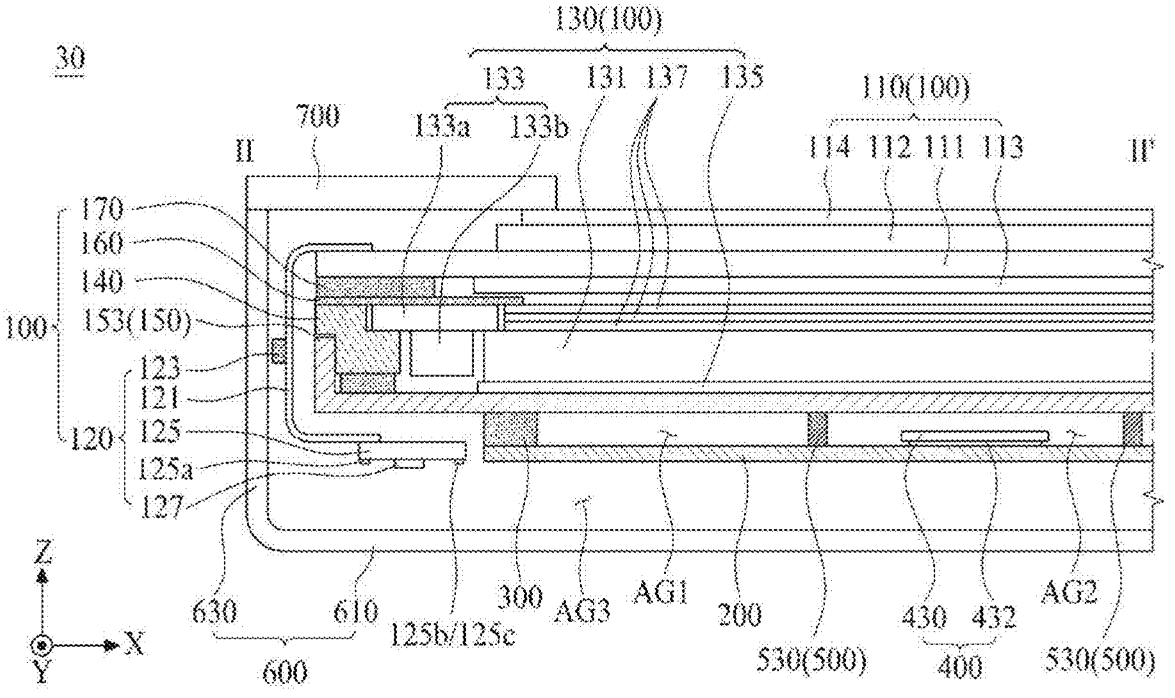
FIG. 4 is a cross-sectional view taken along line II-II' illustrated in FIG. 2.

FIG. 2 illustrates a computing apparatus according to an embodiment of the present disclosure. FIG. 3 is a cross-sectional view taken along line I-I' illustrated in FIG. 2 according to an embodiment of the present disclosure. FIG. 4 is a cross-sectional view taken along line II-II' illustrated in FIG. 2.

With reference to the examples of FIGS. 2 to 4, the computing apparatus according to an embodiment of the present disclosure may include a system body 10, a hinge part 20, and a display apparatus 30, which may be rotatably coupled or connected to the system body 10 through the hinge part 20.

The system body 10 may include a main board, various circuits mounted on the main board, various storage mediums, peripheral devices, a keyboard, a power device, etc. The various circuits mounted on the main board may include a central control circuit for processing various pieces of information, an image processing circuit for processing data according to control by the central control circuit, a sound processing circuit for processing a sound according to control by the central control circuit, etc. The system body 10 may process various pieces of information, may generate video data and a sound signal, and may provide the display apparatus 30 with the processed information, the generated video data, and the sound signal.

The hinge part 20 may be installed between the system body 10 and the display apparatus 30, and may rotatably support a lower portion of the display apparatus 30. The display apparatus 30 may be rotatably installed in the hinge part 20, and may cover an upper surface of the system body 10, or may be unfolded by a certain angle from the upper surface of the system body 10 with the hinge part 20 as a rotation shaft. The display apparatus 30 may be configured to display an image corresponding to video data provided from the system body 10, based on a timing control signal provided from the system body 10, and may output a panel sound PSW and an edge or periphery sound ESW corresponding to a sound signal provided from the system body 10. For example, the sound signal may be synchronized with an image signal, but embodiments are not limited thereto.

The display apparatus 30 according to an embodiment of the present disclosure may include a display module 100, a vibration plate 200, a connection member 300, a vibration module 400, an enclosure 500, a system rear cover 600, and a system front cover 700. The display module 100 may include a display panel 110, a panel driving circuit unit 120, a backlight unit 130, a panel guide 140, and a supporting cover 150. The display panel 110 may display an image using light irradiated from the backlight unit 130, and may include a lower substrate 111, an upper substrate 112, a lower polarization member 113, and an upper polarization member 114.

The lower substrate 111, which may be a thin-film transistor (TFT) array substrate, may include a pixel array including a plurality of pixels respectively provided in a plurality of pixel areas defined by intersections of a plurality of gate lines and a plurality of data lines. Each of the plurality of pixels may include a TFT connected to a gate line and a data line corresponding thereto, a pixel electrode connected to the TFT, and a common electrode, which may be adjacent to the pixel electrode, and may be supplied with a common voltage.

The lower substrate 111 may further include a pad part in a first periphery thereof and a gate driving circuit in a second periphery thereof. The pad part may provide the pixel array and the gate driving circuit with a signal supplied from the outside. For example, the pad part may include a plurality of data pads connected to the plurality of data lines through a plurality of data link lines, and a plurality of gate input pads connected to the gate driving circuit via a gate control signal line.

The gate driving circuit may be embedded (or integrated) into the first periphery of the lower substrate 111 to be connected to the plurality of gate lines in a one-to-one relationship. For example, the gate driving circuit may be a shift register including a transistor, which may be formed through the same process as a process of forming a TFT in each of the pixel areas. As another example, the gate driving circuit may be in the panel driving circuit 120 without being embedded into the lower substrate 111.

The upper substrate 112, a color filter array substrate, may include a pixel pattern that may define an opening area overlapping each of the pixel areas on the lower substrate 111, and a color filter layer in the opening area. The upper substrate 112 may be attached to the lower substrate 111 with a liquid crystal layer therebetween by a sealant. The liquid crystal layer may be between the lower substrate 111 and the upper substrate 112, and may include a liquid crystal including liquid crystal molecules having an alignment direction, which may be changed based on an electric field generated from the common voltage and a data voltage applied to the pixel electrode in each of the plurality of pixels.

The lower polarization member 113 may be on a lower surface of the lower substrate 111, and may polarize light, irradiated from the backlight unit 130, to a first polarization axis to irradiate the polarized light onto the lower substrate 111. The upper polarization member 114 may be on an upper surface of the upper substrate 112, and may polarize light that passes through the upper substrate 112, and may be output to the outside. The display panel 110 may drive the liquid crystal layer according to the electric field generated from the common voltage and the data voltage applied to the pixel electrode in each of the plurality of pixels, thereby displaying an image using light passing through the liquid crystal layer.

The panel driving circuit unit 120 may be connected to the pad part provided in the display panel 110, and may display an image, corresponding to the video data supplied from the system body 10, based on an output of each pixel. The panel driving circuit unit 120 according to an embodiment may include a plurality of data flexible circuit films 121, a plurality of data driving integrated circuits (ICs) 123, a printed circuit board (PCB) 125, and a timing control circuit 127.

Each of the plurality of data flexible circuit films 121 may be attached to the pad part on the lower substrate 111 of the display panel 110 by, for example, a film attachment process or a tape automated bonding process. Each of the plurality of data flexible circuit films 121 may be bent to surround a side surface of each of the display panel 110 and the backlight unit 130, and may be connected to the PCB 125 at a rear surface of the supporting cover 150.

Each of the plurality of data driving ICs 123 may be individually mounted on a corresponding data flexible circuit film of the plurality of data flexible circuit films 121. Each of the plurality of data driving ICs 123 may receive pixel data and a data control signal supplied from the timing control circuit 127, may convert the pixel data into a pixel-based analog data signal according to the data control signal, and may supply the analog data signal to a corresponding data line. As another example, each of the plurality of data driving ICs 123 may be directly mounted on the first periphery of the lower substrate 111 by a chip bonding process, and may be connected to a plurality of data lines. In this case, the plurality of data flexible circuit films 121 may be omitted.

The PCB 125 may be connected to the plurality of data flexible circuit films 121. The PCB 125 may support the timing control circuit 127, and may transfer signals and power between elements of the panel driving circuit unit 120. The PCB 125 may include a user connector **125*a*, connected to the system body 10 through a cable, and first and second sound output connectors 125*b* and 125*c* connected to the vibration module 400**.

The timing control circuit 127 may be mounted on the PCB 125, and may receive, through the user connector **125*a* of the PCB 125, the video data and a timing sync signal supplied from the system body 10. The timing control circuit 127 may align the video data to generate pixel data suitable for a pixel arrangement structure of the display panel 100, based on the timing sync signal, and may supply the generated pixel data to the data driving ICs 123. Also, the timing control circuit 127 may generate the data control signal and a gate control signal, based on the timing synchronized signal. Thus, the timing control circuit 127 may control a driving timing of each of the plurality of data driving ICs 123** by the data control signal, and may control a driving timing of the gate driving circuit using the gate control signal.

The panel driving circuit unit 120 may further include a plurality of data flexible circuit films and a plurality of gate driving ICs, instead of a gate driving circuit. For example, the lower substrate 111 of the display panel 110 may further include a gate pad part, which may be provided in a third periphery thereof, and may include a plurality of gate pads connected to a plurality of gate lines through a plurality of gate link lines. Each of the plurality of gate flexible circuit films may be attached to the gate pad part on the lower substrate 111 of the display panel 110 by a film attachment process. Each of the plurality of gate flexible circuit films may be bent to a side surface of the display panel 110. Each of the plurality of gate driving ICs may be individually mounted on a corresponding gate flexible circuit film of the plurality of gate flexible circuit films. Each of the plurality of gate driving ICs may receive the gate control signal supplied from the timing control circuit 127 through a gate input pad, may generate a gate pulse according to the gate control signal, and may supply the gate pulse to the gate lines in a predetermined order. As another example, each of the plurality of gate driving ICs may be directly mounted on the third periphery of the lower substrate 111 by a chip bonding process, may be connected to a plurality of gate lines, and may be connected to the gate input pad on the lower substrate 111. In this case, the plurality of gate flexible circuit films may be omitted.

The backlight unit 130 may be on or facing a rear surface of the display panel 110, and may irradiate light onto the rear surface of the display panel 110. The backlight unit 130 according to an embodiment of the present disclosure may include a light guide plate 131, a light source unit 133, a reflective sheet 135, and an optical sheet part 137.

The light guide plate 131 may include a light incident surface, which may overlap the display panel 110, and may be provided on one sidewall thereof. The light guide plate 131 may include a light-transmitting plastic or glass material. The light guide plate 131 may transfer (or output) light, which may be incident through the light incident surface from the light source unit 133, to the display panel 110.

The light source unit 133 may irradiate light onto the light incident surface in the light guide plate 131. The light source unit 133 according to an embodiment of the present disclosure may include a light source PCB 133*a* and a plurality of light-emitting diodes (LEDs) 133*b*, which may be mounted on the light source PCB 133*a*, and may irradiate light onto the light incident surface of the light guide plate 131. The light source unit 133 may be covered by a light source housing. The light source housing may cover a front surface of the panel guide 140 and an edge or periphery of the optical sheet part 137, which may be adjacent to each other with the light source unit 133 therebetween, and may cover an upper portion of the light source unit 133.

The reflective sheet 135 may cover a rear surface of the light guide plate 131. The reflective sheet 135 may reflect light, which may be incident from the light guide plate 131, toward the light guide plate 131 to minimize or reduce the loss of the light.

The optical sheet part 137 may be on a front surface of the light guide plate 131, and may enhance a luminance characteristic of light output from the light guide plate 131. The optical sheet part 137 according to an embodiment of the present disclosure may include a lower diffusive sheet, a lower prism sheet, and an upper prism sheet, but is not limited thereto. For example, the optical sheet part 137 may be include a stacked combination of one or more sheets one among a diffusive sheet, a prism sheet, a dual-brightness enhancement film (DBEF), and a lenticular sheet, or may include one composite sheet having a light diffusing function and a light collecting function. According to an embodiment of the present disclosure, when sound is output or generated based on a vibration of the display panel 110, which may respond to a vibration of the vibration plate 200, the loss of vibration of the vibration plate 200 may be minimized or reduced while the vibration is being transferred to the display panel 110. The optical sheet unit according to an embodiment of the present disclosure may include one composite sheet having the light diffusing function and the light collecting function.

The panel guide 140 may be accommodated into the supporting cover 150, and may support the light source unit 133 and a periphery of a rear surface of the display panel 110. The panel guide 140 may include a panel supporting part 141 that may support the periphery of the rear surface of the display panel 110, and a cover coupling or connection part 143 that may be recessed from an outer surface of the panel supporting part.

The supporting cover 150 may support the panel guide 140. The supporting cover 150 may include a metal material, a plastic material, and/or the like. For example, to secure rigidity and a heat dissipation characteristic of the backlight unit 130, the supporting cover 150 may include a metal material. The supporting cover 150 according to an embodiment of the present disclosure may include a cover plate 151 and a side cover 153.

The cover plate 151 may cover a rear surface of the backlight unit 130, and thus, may support the reflective sheet 135 of the backlight unit 130 and the panel guide 140. For example, the panel guide 140 may be attached to or provided on the cover plate 151 by an adhesive member, such as a double-sided tape.

The side cover 153 may be vertically provided from a periphery of a front surface of the cover plate 151, and may surround an outer sidewall of the panel guide 140. For example, the side cover 153 may be inserted into the cover connection part 143 of the panel guide 140, and thus, may not protrude to the outside of an outer surface of the panel guide 140.

The display module 100 according to an embodiment of the present disclosure may further include a light blocking member 160. The light blocking member 160 may cover a front surface of the panel guide 140 adjacent to the light source unit 133 and an edge or periphery of the optical sheet part 137 adjacent to the light source unit 133 and the light source PCB 133*a* of the light source unit 133, thereby preventing or reducing the light leakage of the light source unit 133. One portion of the light blocking member 160 may extend to cover an outer surface of the panel guide 140 adjacent to the light source unit 133, the side cover 153 of the supporting cover 150, and a periphery of a rear surface of the cover plate 151. The light blocking member 160 according to an embodiment of the present disclosure may be a black single-sided tape, but is not limited thereto.

The display module 100 according to an embodiment of the present disclosure may further include a panel coupling or connection member 170. The panel coupling or connection member 170 may be between the periphery of the rear surface of the display panel 110 and the panel guide 140, and may attach the display panel 110 on the panel guide 140. For example, the display panel 110 may be attached to or provided on the panel guide 140 by the panel connection member 170. The panel connection member 170 overlapping the light source unit 130 may be attached to or provided on the light blocking member 160. The panel connection member 170 according to an embodiment of the present disclosure may be a double-sided tape or a double-sided foam tape, but is not limited thereto.

The display module 100 may display an image using light provided to the display panel 110 from the backlight unit 130, and may output the panel sound PSW and the edge or periphery sound ESW, each generated based on a vibration of the display panel 110 responding to a vibration of the vibration plate 200, toward the forward region in front of the display panel 110 (for example, in a direction toward a face of a viewer). For example, the display module 100 may have a thin (or slim) structure, for example, having a thickness of 4 mm or less, to have the same vibration amount as that of the vibration plate 200.

The vibration plate 200 may be coupled or connected to a rear surface of the display module 100. The vibration plate 200 may be coupled or connected to a rear surface of the supporting cover 150 by the connection member 300 with the first air gap AG1 therebetween. The vibration plate 200 may include at least one of the above-described metal materials, and a repetitive description relevant thereto is omitted.

The connection member 300 may be between the cover plate 151 of the supporting cover 150 and the vibration plate 200. The connection member 300 may support the vibration plate 200, and may provide the first air gap AG1 between the display module 100 (e.g., the reflective sheet 135) and the vibration plate 200. The first air gap AG1 may be a sealed space or a vibration space for enabling a vibration of the vibration plate 200. The connection member 300 according to an embodiment of the present disclosure may overlap an edge or periphery portion of the light guide plate 131.

The vibration module 400 may be disposed on a front surface of the vibration plate 200 to directly face the rear surface of the display module 100 (for example, the cover plate 151 of the supporting cover 150). The vibration module 400 may vibrate based on a sound driving signal, which may directly input from the system body 10, or may indirectly input through the PCB 125 of the display module 100, thereby allowing the vibration plate 200 to vibrate. The vibration module 400 according to an embodiment of the present disclosure may include a first vibration-generating device 410 and a second vibration-generating device 430, which may be attached to or provided on the front surface of the vibration plate 200 by adhesive members 412 and 432. The first vibration-generating device 410 and the second vibration-generating device 430 may each include a piezo-electric material layer described above, and thus, their detailed descriptions are not repeated.

The enclosure 500 may be disposed in each of a first rear region and a second rear region of the vibration plate 200 to individually surround each of the first vibration-generating device 410 and the second vibration-generating device 430. For example, the enclosure 500 may be in a horizontal vibration region of the vibration plate 200, which may be adjusted in each of the first rear region and the second rear region of the vibration plate 200, and may prevent (or attenuate) a horizontal vibration (or an undesired vibration) of the vibration plate 200, thereby decreasing the total harmonic distortion characteristic of the vibration plate 200 to enhance the sound quality and sound pressure characteristic of the display apparatus.

The enclosure 500 according to an embodiment of the present disclosure may include a first enclosure 510 and a second enclosure 530. The first enclosure 510 may be between the rear surface of the display module 100 and the vibration plate 200, and may surround the first vibration-generating device 410. The first enclosure 510 according to an embodiment of the present disclosure may surround the first vibration-generating device 410 in the first rear region of the vibration plate 200, and thus, may provide a second air gap AG2 surrounding the first vibration module 410 in the first air gap AG1. For example, the second air gap AG2 may be a sealed space or a vibration space for enabling the vibration plate 200 to vibrate based on a vibration of the first vibration-generating device 410. The first enclosure 510 may prevent or attenuate a horizontal vibration or an undesired vibration, each occurring in the first rear region of the vibration plate 200, and may prevent or decrease mutual interference between a vibration based on the first vibration-generating device 410 and a vibration based on the second vibration-generating device 430.

The second enclosure 530 may be between the rear surface of the display module 100 and the vibration plate 200, and may surround the second vibration-generating device 430. The second enclosure 530 according to an embodiment of the present disclosure may surround the second vibration-generating device 430 in the second rear region of the vibration plate 200, and thus, may provide a second air gap AG2 surrounding the second vibration module 430 in the first air gap AG1. For example, the second air gap AG2 may be a sealed space or a vibration space for enabling the vibration plate 200 to vibrate based on a vibration of the second vibration-generating device 430. The second enclosure 530 may prevent or attenuate a horizontal vibration or an undesired vibration each occurring in the second rear region of the vibration plate 200, and may prevent or decrease mutual interference between a vibration based on the first vibration-generating device 410 and a vibration based on the second vibration-generating device 430.

The system rear cover 600 may accommodate the display module 100 and the vibration plate 200 coupled or connected to the vibration module 400. The system rear cover 600 according to an embodiment of the present disclosure may include a rear structure 610 and a side structure 630.

The rear structure 610, which may be an outermost structure on a rear surface of the display apparatus, may support the supporting cover 150 of the display module 100, and may cover the rear surface of the vibration plate 200 with a third air gap AG3 therebetween. For example, the rear structure 610 may be spaced apart from the vibration plate 200 by a predetermined distance to not physically contact the vibration plate 200 when the vibration plate 200 is vibrating. The side structure 630, which may be an outermost structure on a side surface of the display apparatus, may be on an edge or in a periphery of the rear structure 610, and may cover side surfaces of the display module 100 and side surfaces of the vibration plate 200 with a border gap BG therebetween.

The system rear cover 600 according to an embodiment of the present disclosure may further include a rear sound member 650. The rear sound member 650 may protrude from a corner portion of each of the rear structure 610 and the side structure 630, or may be installed in the corner portion of each of the rear structure 610 and the side structure 630. For example, the rear sound member 650 may be referred to as a "sound guide member," a "rear sound guide member," or a "rear sound guider," but the term is not limited thereto.

The rear sound member 650 according to an embodiment of the present disclosure may include an inclined surface or a curved surface, each facing the third air gap AG3 and the border gap BG. The rear sound member 650 may guide a traveling path of a rear sound, traveling toward the border gap BG via the third air gap AG3, in a direction toward the border gap BG (for example, a direction toward a front surface of the display panel 110), thereby blocking, reducing, or minimizing a rear sound, which may again be reflected to the third air gap AG3 by the side structure 630. For example, a rear sound, which may be generated in the third air gap AG3 based on a vibration of the vibration plate 200, may be output in a direction toward the front surface of the display panel 110 through the border gap BG, and thus, may be an edge or periphery sound ESW.

The system front cover 700 may cover a periphery of a front surface of the display panel 110 and the border gap BG. The system front cover 700 may have a tetragonal (quadrilateral) frame shape, and may cover the periphery of the front surface of the display panel 110 and the border gap BG. The system front cover 700 may be coupled or connected to the side structure 630 of the system rear cover 600 by a fastening member, such as a hook. The system front cover 700 may cover the panel driving circuit unit 120 and a front surface of the display module 100, other than a display area of the display panel 110.

The system front cover 700 according to an embodiment of the present disclosure may include at least one sound emission part 710 overlapping the border gap BG. The sound emission part 710 may include a plurality of sound emission ports 710*a* and 710*b*, which may vertically pass through the system front cover 600 overlapping the borer gap BG to communicate the border gap BG with the outside. For example, the sound emission part 710 may be disposed in at least one of first to fourth corner portions of the system front cover 700 and a middle portion between the first to fourth corner portions.

The computing apparatus according to an embodiment of the present disclosure may include the display module 100, which may vibrate based on a vibration of the vibration plate 200 performed based on a vibration of the vibration module 400, and thus, may output the panel sound PSW, generated based on the vibration of the display module 100, toward a forward region in front of the display panel 110, thereby outputting a high-quality sound of a broad sound band, realizing a sound field which may fully fill a whole screen, and enhancing an immersion experience of a viewer due to harmony (or match) between an image and a sound. Also, the computing apparatus according to an embodiment of the present disclosure may include the enclosure 500, which may be near the vibration module 400 to prevent (or attenuate) a horizontal vibration of the vibration plate 200, which may vibrate based on a vibration of the vibration module 400. Thus, the total harmonic distortion characteristic of the vibration plate 200 may be reduced, thereby enhancing sound quality and a sound pressure characteristic. Also, in the computing apparatus according to an embodiment of the present disclosure, a panel vibration sound generated based on the vibration of the display module 100 may be directly output as the panel sound PSW toward the forward region in front of the display panel 110, and a rear sound (or a plate vibration sound) generated based on the vibration of the vibration plate 200 may be output as the edge sound ESW toward the forward region in front portion of the display panel 110 via the third air gap AG3 and the border gap BG, instead of toward a rearward region behind and/or a downward region under the display panel 110, thereby accurately transferring a sound and improving sound quality to increase an immersion experience of a viewer.

Also, the computing apparatus according to an embodiment of the present disclosure may output the panel sound PSW generated based on a vibration of the display panel 110 and the edge or periphery sound ESW, which may be output toward a forward region in front portion of the display panel 110 through the border gap BG based on a vibration of the vibration plate 200, even without a speaker embedded into the system body 10. Accordingly, an embedded speaker embedded into the system body 10 may be omitted. Thus, a weight of the system body may be reduced. Also, a space obtained by removing the embedded speaker may be used as a space in which a battery may be provided, thereby enabling an increase in the size of the battery.

Figure 5:
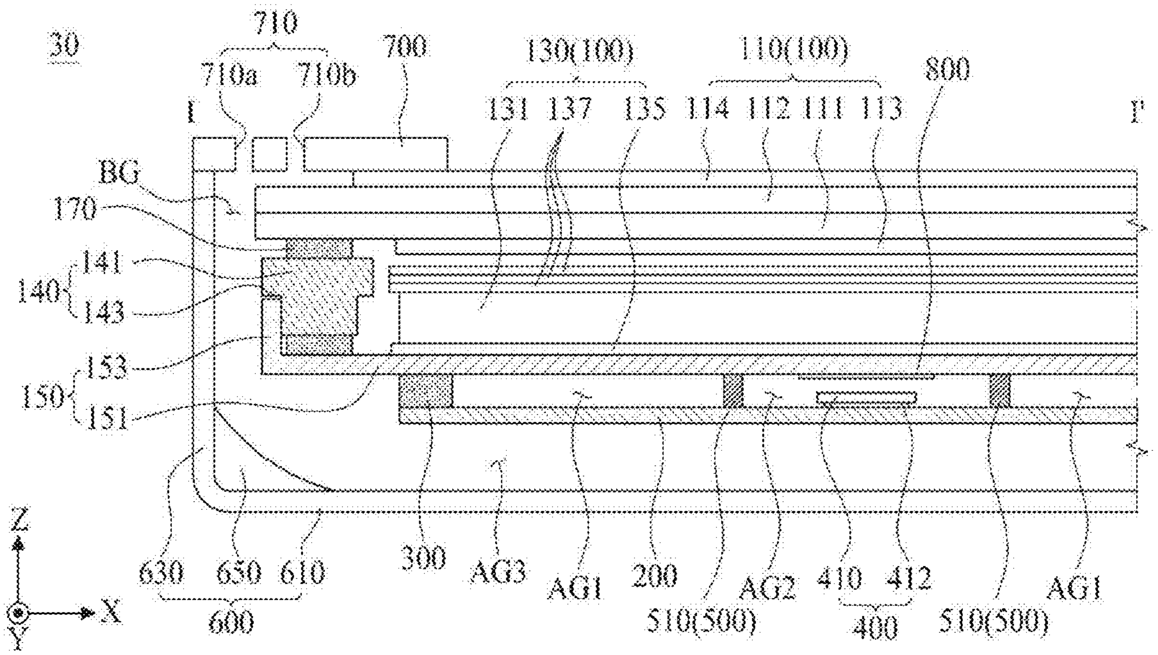
FIG. 5 is a cross-sectional view taken along line I-I' illustrated in FIG. 2 according to another embodiment of the present disclosure.

FIG. 5 is a cross-sectional view taken along line I-I' illustrated in FIG. 2 according to another embodiment of the present disclosure.

FIG. 5 illustrates an embodiment in which a protection member may be added to the display apparatus illustrated in the examples of FIGS. 2 to 4. Thus, in the description below, only modified elements will be described in detail, and in descriptions of the other elements, as in FIGS. 2 to 4, like reference numerals refer to like elements and repetitive descriptions are omitted or will be briefly given.

With reference to FIG. 5, a display apparatus according to an embodiment of the present disclosure may further include a protection member 800. The protection member 800 may be on or facing a rear surface of a display module 100, facing a vibration module 400. The protection member 800 according to an embodiment of the present disclosure may be on or facing a rear surface of a supporting cover 150, facing the vibration module 400, and may have a size that may be greater than that of each of a plurality of vibration-generating devices 410 and 430 of the vibration module 400. The protection member 800 may prevent or reduce the vibration-generating devices 410 and 430 of the vibration module 400 from being damaged by a physical impact and/or an electrical impact, such as static electricity. For example, the vibration-generating devices 410 and 430 may be damaged by static electricity, which may occur in the display module 100, such as a panel driving circuit unit, or may flow in from the outside, or may be damaged by a physical contact with the display module 100 caused by pressing of the display module 100. Therefore, the protection member 800 may be between the display module 100 and each of the vibration-generating devices 410 and 430, and thus, may cut off static electricity transferred to the vibration-generating devices 410 and 430 through the display module 100 to protect the static electricity from the vibration-generating devices 410 and 430, and may protect the vibration-generating devices 410 and 430 from a physical impact applied to each of the vibration-generating devices 410 and 430. The protection member 800 according to an embodiment of the present disclosure may include a single-sided insulation tape or an insulation single-sided foam tape, each including an adhesive layer attached to the supporting cover 150. For example, the protection member 800 may be a polyethylene terephthalate (PET) insulation tape or a polyvinyl chloride (PVC) insulation tape.

As another example, the protection member 800 may be alternatively or additionally on each of the vibration-generating devices 410 and 430 of the vibration module 400 directly facing the rear surface of the display module 100. For example, the protection member 800 may increase a weight of each of the vibration-generating devices 410 and 430 to decrease a resonance frequency of a vibration plate 200, thereby increasing a frequency characteristic of a low-pitched sound band of a sound generated based on a vibration of the vibration plate 200.

Figure 6:
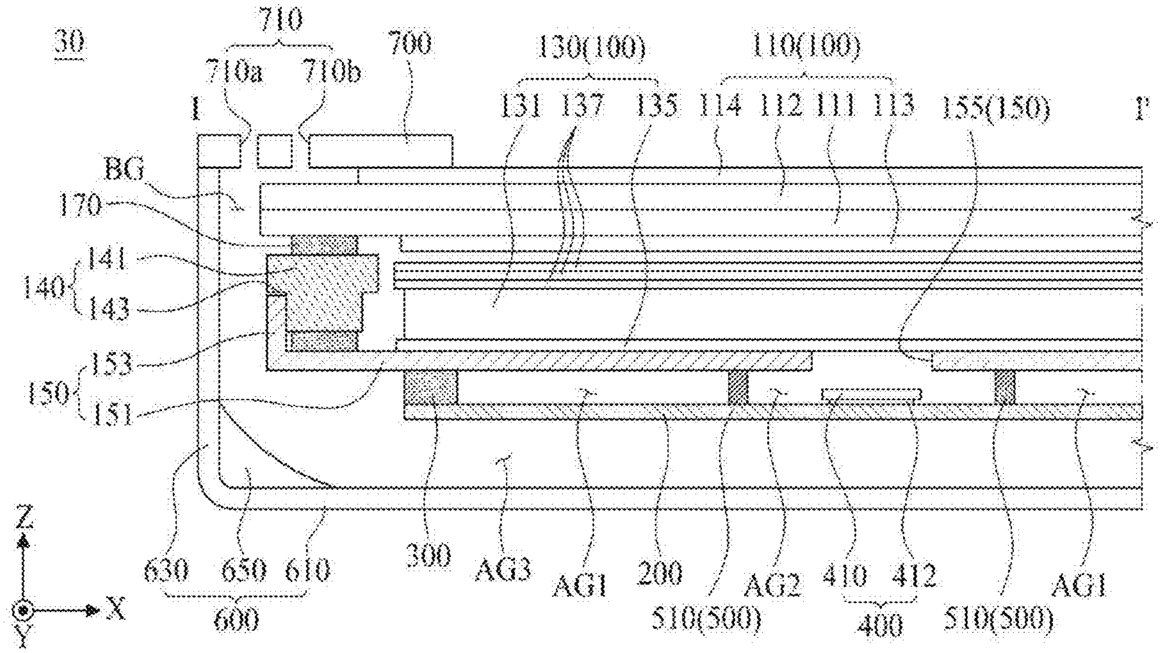
FIG. 6 is a cross-sectional view taken along line I-I' illustrated in FIG. 2 according to another embodiment of the present disclosure.

FIG. 6 is a cross-sectional view taken along line I-I' illustrated in FIG. 2 according to another embodiment of the present disclosure.

FIG. 6 illustrates an embodiment implemented by modifying a structure of the supporting cover illustrated in each of the examples of FIGS. 3 and 4. Thus, in the description below, only modified elements will be described in detail, and in descriptions of the other elements, as in FIGS. 2 to 5, like reference numerals refer to like elements and repetitive descriptions are omitted or will be briefly given.

With reference to FIG. 6, a supporting cover 150 according to another embodiment of the present disclosure may include a cover plate 151, a side cover 153, and an opening or hole 155. The cover plate 151 and the side cover 153 may be as described above with reference to FIGS. 3 and 4, and thus, their repetitive descriptions are omitted.

The opening or hole 155 may be provided in the cover plate 151 to face a vibration module 400. The opening 155 according to an embodiment of the present disclosure may vertically pass through the cover plate 151, and may have a size that may be greater than that of each of a plurality of vibration-generating devices 410 and 430 of the vibration module 400 for the vibration-generating devices 410 and 430 to be inserted or accommodated therein. The opening 155 may protect the vibration-generating devices 410 and 430 from a physical impact applied to each of the vibration-generating devices 410 and 430 by the display module 100. For example, when the display module 100 is excessively pressed, each of the vibration-generating devices 410 and 430 may be inserted or accommodated into the opening 155 of the supporting cover 150, and may not physically contact the cover plate 151 of the supporting cover 150, thereby preventing or reducing the vibration-generating devices 410 and 430 from being damaged by the physical impact caused by the display module 100.

The supporting cover 150 according to another embodiment of the present disclosure may decrease in weight by a weight corresponding to a size of the opening 155. Thus, a weight of the display module 100 may be reduced, and a weight of a computing apparatus may also be reduced.

Figure 7:
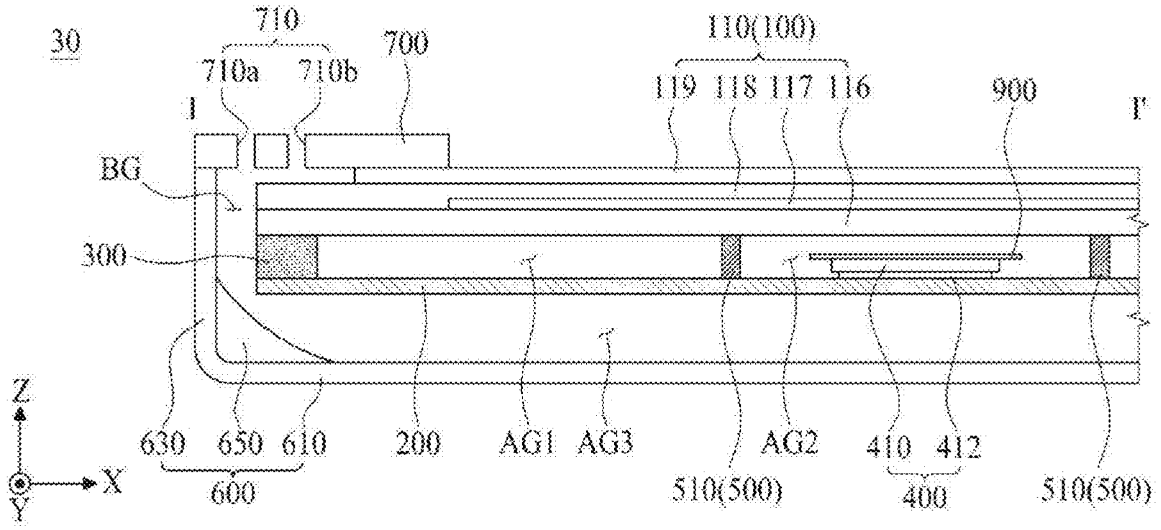
FIG. 7 is a cross-sectional view taken along line I-I' illustrated in FIG. 2 according to another embodiment of the present disclosure.

FIG. 7 is a cross-sectional view taken along line I-I' illustrated in FIG. 2 according to another embodiment of the present disclosure.

FIG. 7 illustrates an embodiment implemented by modifying a structure of the display apparatus illustrated in each of the examples of FIGS. 3 and 4. Thus, in description below, only modified elements will be described in detail, and in descriptions of the other elements, as in FIGS. 2 to 6, like reference numerals refer to like elements and repetitive descriptions are omitted or will be briefly given.

With reference to FIG. 7 in conjunction with FIG. 2, in a computing apparatus according to an embodiment of the present disclosure, a display apparatus 30 according to another embodiment of the present disclosure may include a display module 100, a vibration plate 200, a connection member 300, a vibration module 400, an enclosure 500, a system rear cover 600, and a system front cover 700. The display module 100 may be accommodated into the system rear cover 600, and may display an image, e.g., an electronic image. The display module 100 according to an embodiment of the present disclosure may include a display panel 110 that may display an image, and a panel driving circuit unit that may drive the display panel 110.

The display panel 110 may be a light-emitting display panel. The display panel 110 according to an embodiment of the present disclosure may include a pixel array substrate 116 including a pixel array 117 including a plurality of pixels, an encapsulation layer 118 that may encapsulate the pixel array 117, and a cover film 119 on an upper surface of the encapsulation layer 118.

The plurality of pixels may be respectively in a plurality of pixel areas, and may be respectively driven by a plurality of pixel driving lines. Also, each of the plurality of pixels may include a pixel circuit, including at least two thin-film transistors (TFTs) and at least one capacitor, and a light-emitting device that may emit light with a current supplied from the pixel circuit. For example, the light-emitting device may include an organic light-emitting layer or a quantum dot light-emitting layer. As another example, the light-emitting device may include a micro light-emitting diode (LED). The encapsulation layer 118 may protect the TFTs and the light-emitting device from an external impact, and may reduce or prevent water or moisture from penetrating into the light-emitting device.

The cover film 119 may be attached to or provided on the upper surface of the encapsulation layer 118 by an adhesive member. The adhesive member may be a transparent adhesive member, but is not limited thereto. The cover film 119 according to an embodiment of the present disclosure may be a polarization film, which may circularly polarize external light reflected by the TFT and/or the pixel driving lines provided on the pixel array substrate 116, thereby enhancing the visibility and contrast ratio of the display panel 110. According to another embodiment of the present disclosure, the cover film 119 may be one or more of: an anti-fingerprint film, a brightness enhancement film, and a barrier film, but is not limited thereto.

The display panel 110 according to an embodiment of the present disclosure may further include a barrier layer and a touch electrode layer between the encapsulation layer 118 and the cover film 119. Also, the display panel 110 may further include a color filter layer on an upper surface of the encapsulation layer 118.

In the present embodiment, the encapsulation layer 118 may be replaced with an encapsulation substrate, which may be attached to the pixel array substrate 116 by a filler surrounding the pixel array 117. If the filler is a transparent filler, the encapsulation substrate may be a transparent encapsulation substrate.

The panel driving circuit unit may be connected to a pad part in the display panel 110, and may display an image, corresponding to video data supplied from the system body 10, by respectively driving each pixel. The panel driving circuit unit according to an embodiment of the present disclosure, as illustrated in FIG. 4, may include the plurality of data flexible circuit films 121, the plurality of data driving ICs 123, the PCB 125, and the timing control circuit 127. Thus, its description is not repeated.

The vibration plate 200 may be coupled or connected to a rear surface of the display module 100. Except for the vibration plate 200 being coupled or connected to the rear surface of the display panel 110 with the connection member 300 therebetween using a first air gap AG1, the vibration plate 200 is as described above. Thus, its description is not repeated.

The vibration module 400 may be attached to or provided on a front surface of the vibration plate 200 by an adhesive member 412. The vibration module 400 may include the above-described first vibration-generating device 410 and second vibration-generating device 430, and may be as described above. Thus, its detailed description is not repeated.

The enclosure 500 may be in each of a first rear region and a second rear region of the vibration plate 200, and may surround the first vibration-generating device 410 and the second vibration-generating device 430 and may be as described above, and thus, its detailed description may not repeated.

The system rear cover 600 may accommodate the display module 100 and the vibration plate 200 coupled or connected to the display module 100. The system rear cover 600 may include a rear structure 610 that may cover a rear surface of the vibration plate 200 with a third air gap AG3 therebetween, a side structure 630 that may be provided in an edge or periphery of the rear structure 610, and may cover side surfaces of the display module 100 and side surfaces of the vibration plate 200, and a rear sound member 650 that may be provided in a corner portion of the rear structure 610 and the side structure 630. The system rear cover 600 is as described above. Thus, its repetitive description is omitted.

The system front cover 700 may have a tetragonal (quadrilateral) frame shape, and may cover a periphery of a front surface of the display panel 110 and a border gap BG between the side structure 630 of the system rear cover 600 and a side surface of the display module 100. Also, the system front cover 700 may include at least one sound emission part 710 including a plurality of sound emission ports 710*a* and 710*b*, which may overlap the border gap BG and may communicate the border gap BG with the outside. The system front cover 700 is as described above. Thus, its repetitive description is omitted.

The display apparatus 30 according to another embodiment of the present disclosure may further include a protection member 900 between the display module 100 and the vibration module 400. The protection member 900 may be on the vibration-generating device 410 of the vibration module 400, directly facing a rear surface of the display module 100. For example, the protection member 900 may have a size that may be greater than that of the vibration-generating device 410 of the vibration module 400. The protection member 900 according to an embodiment of the present disclosure, as described above, may prevent or reduce the vibration-generating device 410 of the vibration module 400 from being damaged by a physical impact and/or an electrical impact, such as static electricity. For example, the protection member 900 may be a polyethylene terephthalate (PET) film, but is not limited thereto.

As another example, the protection member 900 may be on the rear surface of the display module 100, facing the vibration module 400. For example, the protection member 900 may be on the rear surface of the display module 100 facing the vibration module 400, and may have a size that may be greater than that of the vibration-generating device 410 of the vibration module 400.

The computing apparatus according to the present embodiment may have the same effect as that of the computing apparatus illustrated in each of the examples of FIGS. 2 to 6. The following embodiments described with reference to the examples of FIGS. 8 to 13 may be combined with any of the embodiments described in reference to the examples of FIGS. 1 to 7.

Figure 8:
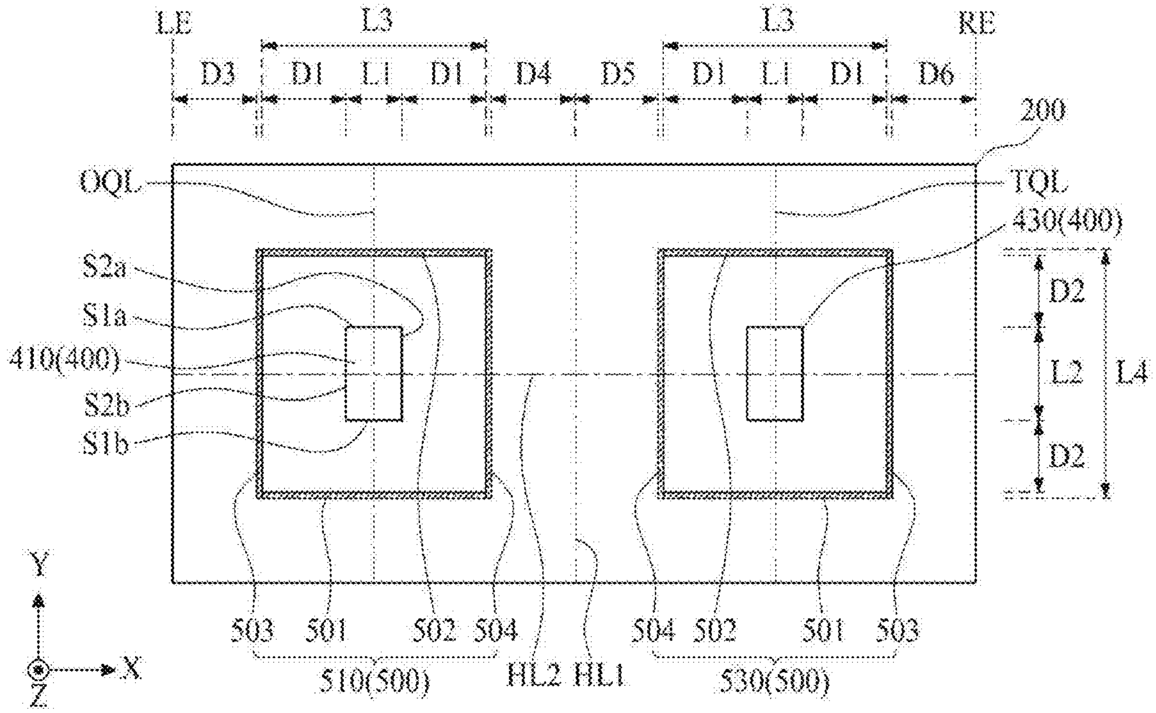
FIG. 8 illustrates an enclosure according to a first embodiment of the present disclosure illustrated in FIG. 3.

FIG. 8 illustrates an enclosure according to a first embodiment of the present disclosure illustrated in FIG. 3.

FIG. 8 illustrates an enclosure and a vibration module on a vibration plate. With reference to FIG. 8, each of a first vibration-generating device 410 and a second vibration-generating device 430 according to an embodiment of the present disclosure may include a pair of first sides S1*a* and S1*b*, which may be parallel to a first direction X, and may each have a first length L1. Each of the first vibration-generating device 410 and the second vibration-generating device 430 may further include a pair of second sides S2*a* and S2*b*, which may be parallel to a second direction Y intersecting the first direction X, and may each have a second length L2. For example, each of the first vibration-generating device 410 and the second vibration-generating device 430 according to an embodiment of the present disclosure may have a rectangular shape in which the first length L1 may be shorter than the second length L2.

The vibration plate 200 according to an embodiment of the present disclosure may include a first rear region and a second rear region, which may be parallel to each other. For example, a center of the first vibration-generating device 410 may be in a center region of the first rear region of the vibration plate 200, and a center of the second vibration-generating device 420 may be in a center region of the second rear region of the vibration plate 200. Therefore, the first vibration-generating device 410 and the second vibration-generating device 430 may be bilaterally symmetrical with each other with respect to a center of the vibration plate 200. For example, the vibration plate 200 according to an embodiment of the present disclosure may include a first half (½) line HL1, a one-quarter (¼) line OQL, and a three-quarter (¾) line TQL, which may be parallel to the second direction Y, and a second half (½) line HL2 parallel to the first direction X. The first half line HL1 may be in a center of a widthwise-direction of the vibration plate 200, and the second half line HL2 may be in a center of a lengthwise-direction of the vibration plate 200. For example, the center of the first vibration-generating device 410 may be at an intersection point of the second half line HL2 and the ¼ line OQL, and the center of the second vibration-generating device 430 may be at an intersection point of the second half line HL2 and the ¾ line TQL. Therefore, the first vibration-generating device 410 and the second vibration-generating device 430 may be symmetrical with each other with respect to the first half line HL1 of the vibration plate 200.

The enclosure 500 according to a first embodiment of the present disclosure may include a first enclosure 510 and a second enclosure 530. The first enclosure 510 may be between a rear surface of the display module 100 and the vibration plate 200, and may surround the first vibration-generating device 410. The first enclosure 510 according to an embodiment of the present disclosure may have a square shape with respect to a center of the first vibration-generating device 410, and may surround the first vibration-generating device 410, thereby preventing or attenuating a horizontal vibration or an undesired vibration, which may each occur in the first rear region of the vibration plate 200, e.g., due to a damping effect.

With respect to a first direction X, a first distance D1 between the first enclosure 510 and each of the second sides S2*a* and S2*b* of the first vibration-generating device 410 may be longer than each of a first length L1 and a second length L2 of the first vibration-generating device 410. For example, the first distance D1 may be longer than the second length L2, and two times shorter than (e.g., half of) the first length L1. For example, when the first distance D1 between the first enclosure 510 and each of the second sides S2*a* and S2*b* of the first vibration-generating device 410 is shorter than each of the first length L1 and the second length L2 of the first vibration-generating device 410, when an excessive damping effect is caused by the first enclosure 510 disposed relatively close to the first vibration-generating device 410, the total harmonic distortion characteristic of the vibration plate 200 may not be sufficiently reduced by harmonic distortion occurring in a sound band of about 1.5 kHz or less. Thus, a sound pressure characteristic and a sound quality characteristic may be reduced in a sound band of about 1.5 kHz or less.

Also, when the first distance D1 between the first enclosure 510 and each of the second sides S2*a* and S2*b* of the first vibration-generating device 410 is two times longer than the first length L1 of the first vibration-generating device 410, when a damping effect is reduced by the first enclosure 510 disposed relatively far away from the first vibration-generating device 410, the total harmonic distortion characteristic of the vibration plate 200 may not be sufficiently reduced by harmonic distortion occurring in a sound band of about 2 kHz or less. Thus, a sound pressure characteristic and a sound quality characteristic may be reduced in a sound band of about 2 kHz or less.

With respect to a second direction Y, a second distance D2 between the first enclosure 510 and each of the first sides S1*a* and S1*b* of the first vibration-generating device 410 may be longer than the first length L1 of the first vibration-generating device 410, and may be shorter than the second length L2 of the first vibration-generating device 410. For example, when the second distance D2 between the first enclosure 510 and each of the first sides S1*a* and S1*b* of the first vibration-generating device 410 is shorter than the first length L1 of the first vibration-generating device 410, when an excessive damping effect is caused by the first enclosure 510 disposed relatively close to the first vibration-generating device 410, the total harmonic distortion characteristic of the vibration plate 200 may not be sufficiently reduced by harmonic distortion occurring in a sound band of about 1.5 kHz or less. Thus, a sound pressure characteristic and a sound quality characteristic may be reduced in a sound band of about 1.5 kHz or less.

Also, when the second distance D2 between the first enclosure 510 and each of the first sides S1*a* and S1*b* of the first vibration-generating device 410 is longer than the second length L2 of the first vibration-generating device 410, when a damping effect is reduced by the first enclosure 510 disposed relatively far away from the first vibration-generating device 410, the total harmonic distortion characteristic of the vibration plate 200 may not be sufficiently reduced by harmonic distortion occurring in a sound band of about 2 kHz or less. Thus, a sound pressure characteristic and a sound quality characteristic may be reduced in a sound band of about 2 kHz or less.

The second enclosure 530 may be between the rear surface of the display module 100 and the vibration plate 200, and may surround the second vibration-generating device 430. The second enclosure 530 according to an embodiment may have a square shape with respect to a center of the second vibration-generating device 430, and may surround the second vibration-generating device 430, thereby preventing or attenuating a horizontal vibration or an undesired vibration, which may each occur in the second rear region of the vibration plate 200 due to a damping effect.

With respect to a first direction X, a first distance D1 between the second enclosure 530 and each of the second sides S2*a* and S2*b* of the second vibration-generating device 430 may be longer than each of a first length L1 and a second length L2 of the second vibration-generating device 430. For example, the first distance D1 may be longer than the second length L2 and two times shorter than (e.g., half of) the first length L1. Here, when the first distance D1 between the second enclosure 530 and each of the second sides S2*a* and S2*b* of the second vibration-generating device 430 is shorter than each of the first length L1 and the second length L2 of the first vibration-generating device 410, or is two times longer than the first length L1 of the first vibration-generating device 410, as described above, a sound pressure characteristic and a sound quality characteristic may be reduced in a sound band of about 1.5 kHz or less or in a sound band of about 2 kHz or less.

With respect to a second direction Y, a second distance D2 between the second enclosure 530 and each of the first sides S1*a* and S1*b* of the second vibration-generating device 430 may be longer than the first length L1 of the second vibration-generating device 430, and may be shorter than the second length L2 of the second vibration-generating device 430. For example, when the second distance D2 between the second enclosure 530 and each of the first sides S1*a* and S1*b* of the second vibration-generating device 430 is shorter than the first length L1 of the second vibration-generating device 430, or is longer than the second length L2 of the second vibration-generating device 430, as described above, a sound pressure characteristic and a sound quality characteristic may be reduced in a sound band of about 1.5 kHz or less or in a sound band of about 2 kHz or less.

The first enclosure 510 and the second enclosure 530 according to an embodiment of the present disclosure may each include first to fourth enclosing members 501 to 504, each having a certain width and a line shape. Each of the first to fourth enclosing members 501 to 504 may be a double-sided adhesive tape, a double-sided adhesive pad, and/or a double-sided foam tape. For example, a width of each of the first to fourth enclosing members 501 to 504 may be about 3 mm, but is not limited thereto.

The first enclosing member 501 may be spaced apart from the vibration-generating devices 410 and 430 by the second distance D2, and may be in parallel with the first direction X. The first enclosing member 501 according to an embodiment of the present disclosure may have a third length L3, which may be longer than the first length L1 of each of the vibration-generating devices 410 and 430.

The second enclosing member 502 may be disposed in parallel with the first enclosing member 501, with the vibration-generating devices 410 and 430 therebetween. A width and a length of the second enclosing member 502 according to an embodiment of the present disclosure may be the same as or different from those of the first enclosing member 501.

The third enclosing member 503 may be spaced apart from the vibration-generating devices 410 and 430 by the first distance D1, and may be in parallel with the second direction Y. The third enclosing member 503 according to an embodiment of the present disclosure may have a fourth length L4, which may be longer than the second length L2 of each of the vibration-generating devices 410 and 430. For example, the fourth length L4 of the third enclosing member 503 may be the same as a distance between an outer surface of the second enclosing member 502 and an outer surface of the first enclosing member 501, which may not face the vibration-generating devices 410 and 430. Inner surfaces of both edges or peripheries of the third enclosing member 503 facing the vibration-generating devices 410 and 430 may contact one side surface of the first enclosing member 501 and one side surface of the second enclosing member 502.

The fourth enclosing member 504 may be disposed in parallel with the third enclosing member 503, with the vibration-generating devices 410 and 430 therebetween. A width and a length of the fourth enclosing member 504 according to an embodiment of the present disclosure may be the same as or different from those of the third enclosing member 503. For example, the fourth length L4 of the fourth enclosing member 504 may be the same as a distance between an outer surface of the second enclosing member 502 and an outer surface of the first enclosing member 501, which may not face the vibration-generating devices 410 and 430. Inner surfaces of both edges or peripheries of the fourth enclosing member 504 facing the vibration-generating devices 410 and 430 may contact the other side surface of the first enclosing member 501 and the other side surface of the second enclosing member 502.

With respect to the first direction X, a third distance D3 between one end LE of the vibration plate 200 and the third enclosing member 503 of the first enclosure 510, a fourth distance D4 between the first half line HL1 of the vibration plate 200 and the fourth enclosing member 504 of the first enclosure 510, a fifth distance D5 between the first half line HL1 of the vibration plate 200 and the fourth enclosing member 504 of the second enclosure 530, and a sixth distance D6 between the other end RE of the vibration plate 200 and the third enclosing member 503 of the second enclosure 510 may be the same. With respect to the first direction X, the third to sixth distances D3 to D6 may be adjusted identically. Thus, vibrations generated in the first rear region and the second rear region of the vibration plate 200 may be separated from each other and a horizontal vibration region of the vibration plate 200 may be reduced, minimized, or removed.

The first enclosure 510 and the second enclosure 530 according to the first embodiment of the present disclosure may decrease, by 15% or less, the total harmonic distortion characteristic of the vibration plate 200 occurring in a sound band of about 1.5 kHz or less, and may decrease, by less than 3%, the total harmonic distortion characteristic of the vibration plate 200 occurring in a sound band of about 1.5 kHz or more. Thus, a sound pressure characteristic and a sound quality characteristic of a full sound band may be enhanced compared to a comparative example in which the enclosure 500 is not disposed.

Figure 9:
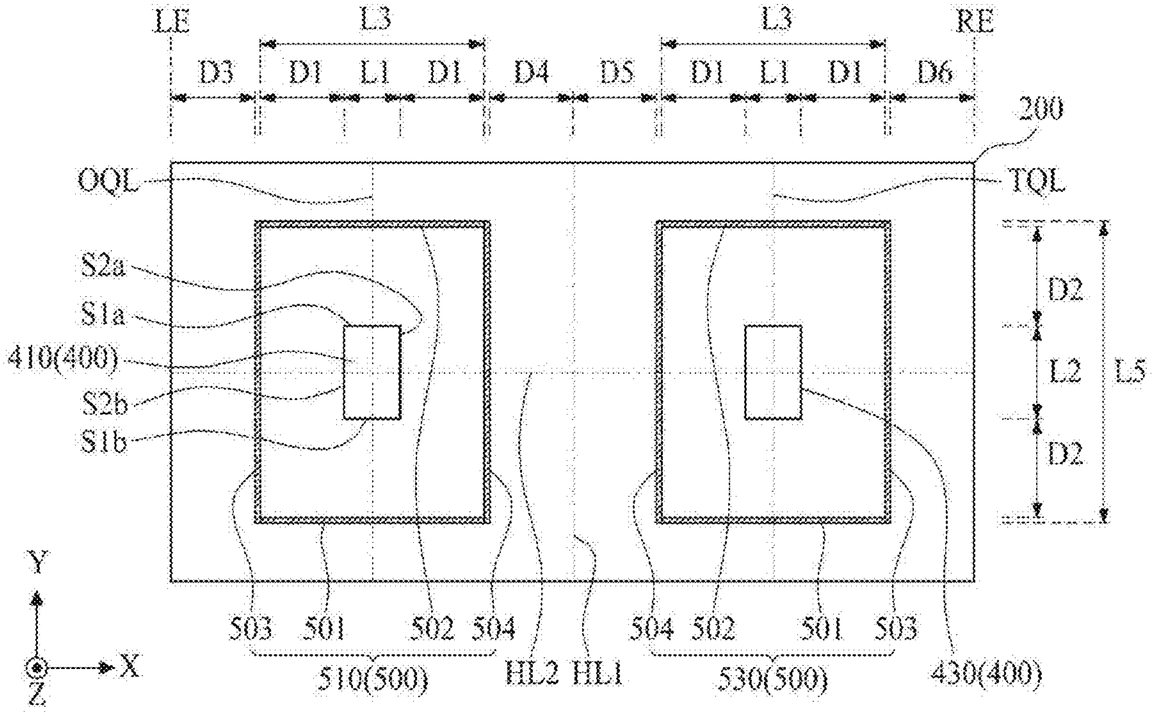
FIG. 9 illustrates an enclosure according to a second embodiment of the present disclosure illustrated in FIG. 3.

FIG. 9 illustrates an enclosure according to a second embodiment of the present disclosure illustrated in FIG. 3.

FIG. 9 illustrates an embodiment implemented by modifying a size of the enclosure illustrated in the example of FIG. 8. Hereinafter, therefore, only an enclosure and elements relevant thereto will be described.

With reference to the example of FIG. 9, a first enclosure 510 and a second enclosure 530 according to the second embodiment of the present disclosure may each have a rectangular shape having a size that may be greater than that of the enclosure illustrated in FIG. 8. For example, a third enclosing member 503 and a fourth enclosing member 504 of each of the first enclosure 510 and the second enclosure 530 may each have a fifth length L5, which may be longer than a second length L2 of each of a plurality of vibration-generating devices 410 and 430. The fifth length L5 of each of the third enclosing member 503 and the fourth enclosing member 504 may be longer than a fourth length L4 of each of the third enclosing member 503 and the fourth enclosing member 504, each illustrated in FIG. 5. Each of the first enclosure 510 and the second enclosure 530 according to the second embodiment of the present disclosure may decrease, by 5% or less, the total harmonic distortion characteristic of the vibration plate 200 occurring in a sound band of about 1.5 kHz or less; may decrease, by 14% or less, the total harmonic distortion characteristic of the vibration plate 200 occurring in a sound band of about 1.5 kHz to about 2 kHz; and may decrease, by less than 2%, the total harmonic distortion characteristic of the vibration plate 200 occurring in a sound band of about 2 kHz or more. Thus, a sound pressure characteristic and a sound quality characteristic of a full sound band may be enhanced compared to a comparative example in which the enclosure 500 is not disposed.

With respect to a first direction X, a first distance D1 between each of the first enclosure 510 and the second enclosure 530 according to the second embodiment of the present disclosure and each of first sides S1*a* and S1*b* of each of the vibration-generating devices 410 and 430 may be longer than each of the first length L1 and the second length L2 of each of the vibration-generating devices 410 and 430, and may be two times shorter than (e.g., half of) the first length L1 of each of the vibration-generating devices 410 and 430. When the first distance D1 is shorter than each of the first length L1 and the second length L2 of each of the vibration-generating devices 410 and 430, and is two times longer than the first length L1 of each of the vibration-generating devices 410 and 430, as described above, a sound pressure characteristic and a sound quality characteristic may be reduced in a sound band of about 1.5 kHz or less or in a sound band of about 2 kHz or less.

With respect to a second direction Y, a second distance D2 between each of the first enclosure 510 and the second enclosure 530 according to the second embodiment of the present disclosure and each of the first sides S1*a* and S1*b* of each of the vibration-generating devices 410 and 430 may be 2.5 times the first length L1 of each of the vibration-generating devices 410 and 430 or may be 1.5 times the second length L2 of each of the vibration-generating devices 410 and 430. For example, when the second distance D2 is 2.5 times longer than the first length L1 of each of the vibration-generating devices 410 and 430, as described above, a sound pressure characteristic and a sound quality characteristic may be reduced in a sound band of about 1.5 kHz or less or in a sound band of about 2 kHz or less.

Figure 10:
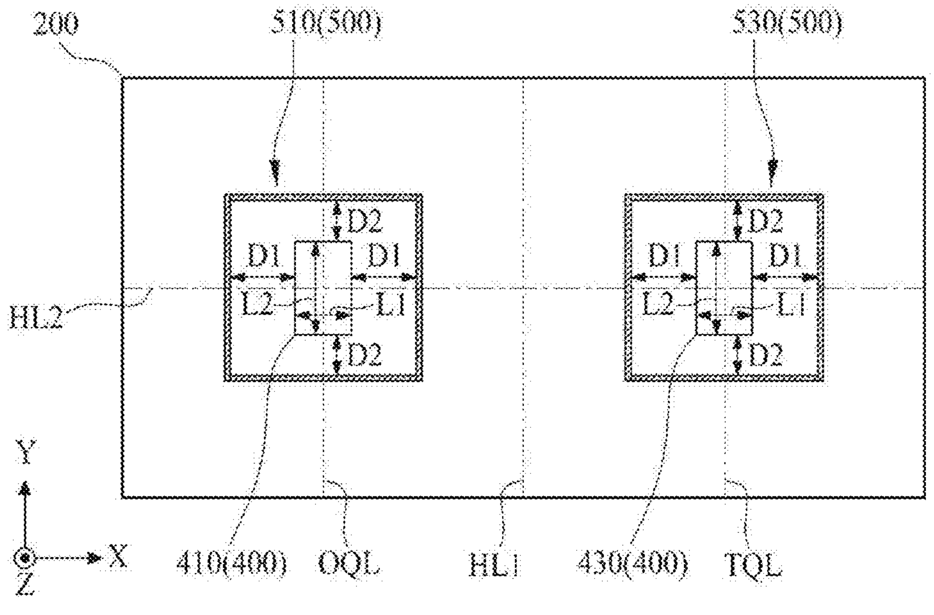
FIG. 10 illustrates an enclosure according to a third embodiment of the present disclosure illustrated in FIG. 3.

FIG. 10 illustrates an enclosure according to a third embodiment of the present disclosure illustrated in FIG. 3.

FIG. 10 illustrates an embodiment implemented by modifying a size of the enclosure illustrated in FIG. 8. Hereinafter, therefore, only an enclosure and elements relevant thereto will be described.

With reference to FIG. 10, a first enclosure 510 and a second enclosure 530 according to the third embodiment of the present disclosure may each have a square shape that may be less in size than the enclosure illustrated in FIG. 8. With respect to a first direction X, a first distance D1 between each of the first enclosure 510 and the second enclosure 530 according to the third embodiment and each of a plurality of vibration-generating devices 410 and 430 may be longer than a first length L1 of each of the vibration-generating devices 410 and 430, and may be shorter than a second length L2 of each of the vibration-generating devices 410 and 430. With respect to a second direction Y, a second distance D2 between each of the first enclosure 510 and the second enclosure 530 according to the third embodiment of the present disclosure and each of the vibration-generating devices 410 and 430 may be shorter than the first length L1 of each of the vibration-generating devices 410 and 430, or may be half of the second length L2 of each of the vibration-generating devices 410 and 430.

Each of the first enclosure 510 and the second enclosure 530 according to the third embodiment of the present disclosure may decrease, by 32% or less, the total harmonic distortion characteristic of the vibration plate 200 occurring in a sound band of about 1.5 kHz or less, and may decrease, by less than 2%, the total harmonic distortion characteristic of the vibration plate 200 occurring in a sound band of about 1.5 kHz or more. Thus, a sound pressure characteristic and a sound quality characteristic of a full sound band may be enhanced compared to a comparative example in which the enclosure 500 is not disposed.

Figure 11:
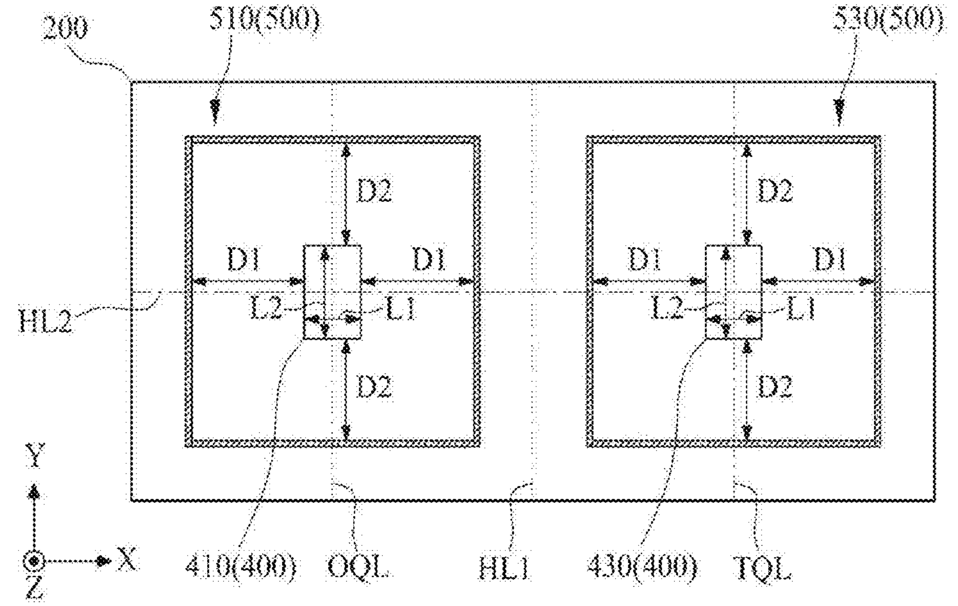
FIG. 11 illustrates an enclosure according to a fourth embodiment of the present disclosure illustrated in FIG. 3.

FIG. 11 illustrates an enclosure according to a fourth embodiment of the present disclosure illustrated in FIG. 3.

FIG. 11 illustrates an embodiment implemented by enlarging a size of the enclosure illustrated in FIG. 8. Hereinafter, therefore, an enclosure and elements relevant thereto will be described.

With reference to FIG. 11, a first enclosure 510 and a second enclosure 530 according to the fourth embodiment of the present disclosure may each have a square shape, which may be greater in size than the enclosure illustrated in FIG. 8. With respect to a first direction X, a first distance D1 between each of the first enclosure 510 and the second enclosure 530 according to the fourth embodiment of the present disclosure and each of a plurality of vibration-generating devices 410 and 430 may be longer than a second length L2 of each of the vibration-generating devices 410 and 430, and may be 2.5 times shorter than a first length L1 of each of the vibration-generating devices 410 and 430. With respect to a second direction Y, a second distance D2 between each of the first enclosure 510 and the second enclosure 530 according to the fourth embodiment of the present disclosure and each of the vibration-generating devices 410 and 430 may be longer than the second length L2 of each of the vibration-generating devices 410 and 430, or may be two times shorter than the first length L1 of each of the vibration-generating devices 410 and 430.

Each of the first enclosure 510 and the second enclosure 530 according to the fourth embodiment of the present disclosure may decrease, by 63% or less, the total harmonic distortion characteristic of the vibration plate 200 occurring in a sound band of about 1.5 kHz or less, and may decrease, by less than 5%, the total harmonic distortion characteristic of the vibration plate 200 occurring in a sound band of about 1.5 kHz or more. Thus, a sound pressure characteristic and a sound quality characteristic of a full sound band may be enhanced compared to a comparative example in which the enclosure 500 is not disposed.

Figure 12:
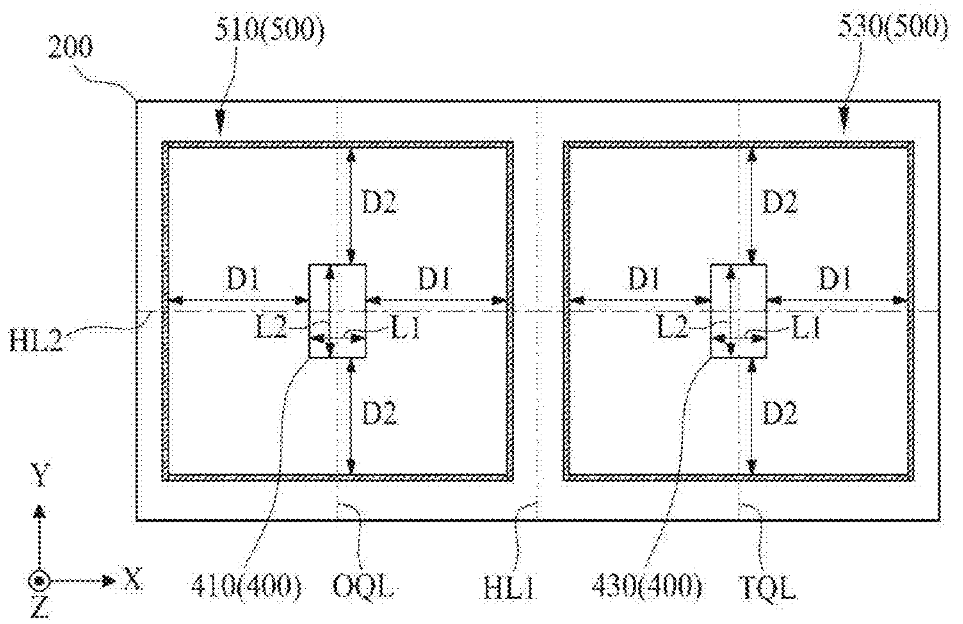
FIG. 12 illustrates an enclosure according to a fifth embodiment of the present disclosure illustrated in FIG. 3.

FIG. 12 illustrates an enclosure according to a fifth embodiment of the present disclosure illustrated in FIG. 3.

FIG. 12 illustrates an embodiment implemented by enlarging a size of the enclosure illustrated in FIG. 8. Hereinafter, therefore, only an enclosure and elements relevant thereto will be described.

With reference to FIG. 12, a first enclosure 510 and a second enclosure 530 according to the fifth embodiment of the present disclosure may each have a square shape, which may be greater in size than the enclosure illustrated in FIG. 11. With respect to a first direction X, a first distance D1 between each of the first enclosure 510 and the second enclosure 530 according to the fifth embodiment of the present disclosure and each of a plurality of vibration-generating devices 410 and 430 may be 1.5 times longer than a second length L2 of each of the vibration-generating devices 410 and 430, and may be three times shorter than a first length L1 of each of the vibration-generating devices 410 and 430. With respect to a second direction Y, a second distance D2 between each of the first enclosure 510 and the second enclosure 530 according to the fifth embodiment of the present disclosure and each of the vibration-generating devices 410 and 430 may be 2.5 times the first length L1 of each of the vibration-generating devices 410 and 430.

Each of the first enclosure 510 and the second enclosure 530 according to the fifth embodiment of the present disclosure may decrease, by 31% or less, the total harmonic distortion characteristic of the vibration plate 200 occurring in a sound band of about 1.5 kHz or less; may decrease, by less than 9%, the total harmonic distortion characteristic of the vibration plate 200 occurring in a sound band of about 1.5 kHz to about 2 kHz; and may decrease, by less than 2%, the total harmonic distortion characteristic of the vibration plate 200 occurring in a sound band of about 2 kHz or more. Thus, a sound pressure characteristic and a sound quality characteristic of a full sound band may be enhanced compared to a comparative example in which the enclosure 500 is not disposed.

Figure 13:
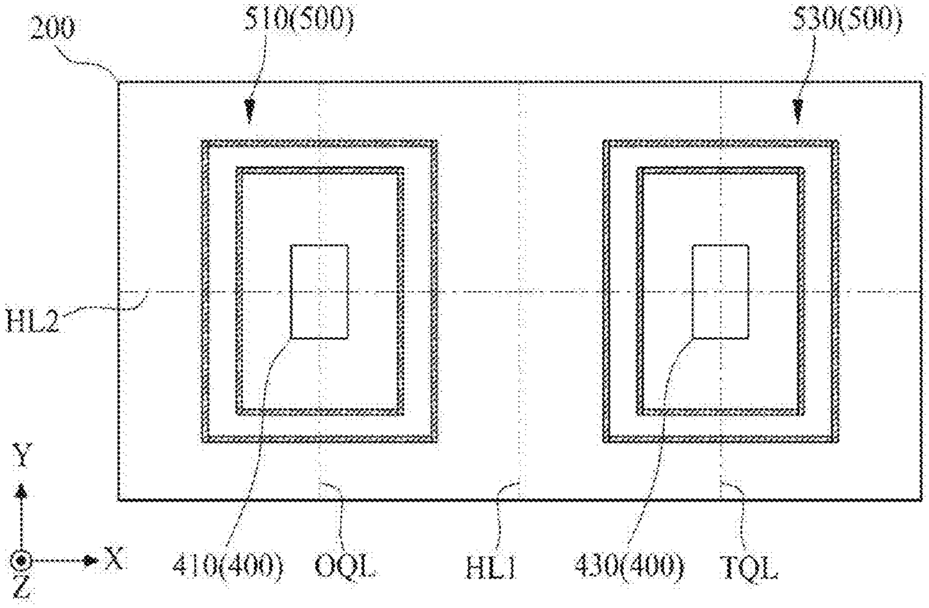
FIG. 13 illustrates an enclosure according to a sixth embodiment of the present disclosure illustrated in FIG. 3.

FIG. 13 illustrates an enclosure according to a sixth embodiment of the present disclosure illustrated in FIG. 3.

FIG. 13 illustrates an embodiment where the enclosure illustrated in FIG. 9 may be disposed in a double structure. Hereinafter, therefore, an enclosure and elements relevant thereto will be described.

With reference to FIG. 13, a first enclosure 510 and a second enclosure 530 according to the sixth embodiment of the present disclosure may each include an external enclosure, having the same or a substantially similar size as that of the enclosure illustrated in FIG. 9, and an internal enclosure disposed between a vibration module and the external enclosure. Here, each of the external enclosure and the internal enclosure may have a rectangular shape. The center of the internal enclosure and the center of the external disclosure may be the same and/or may respectively correspond to a center of the first and second vibration-generating device.

Each of the first enclosure 510 and the second enclosure 530 according to the sixth embodiment of the present disclosure may decrease, by 18% or less, the total harmonic distortion characteristic of the vibration plate 200 occurring in a sound band of about 1.5 kHz or less; may decrease, by less than 6%, the total harmonic distortion characteristic of the vibration plate 200 occurring in a sound band of about 1.5 kHz to about 2 kHz; and may decrease, by less than 1%, the total harmonic distortion characteristic of the vibration plate 200 occurring in a sound band of about 2 kHz or more. Thus, a sound pressure characteristic and a sound quality characteristic of a full sound band may be enhanced compared to a comparative example in which the enclosure 500 is not disposed.

Figure 14:
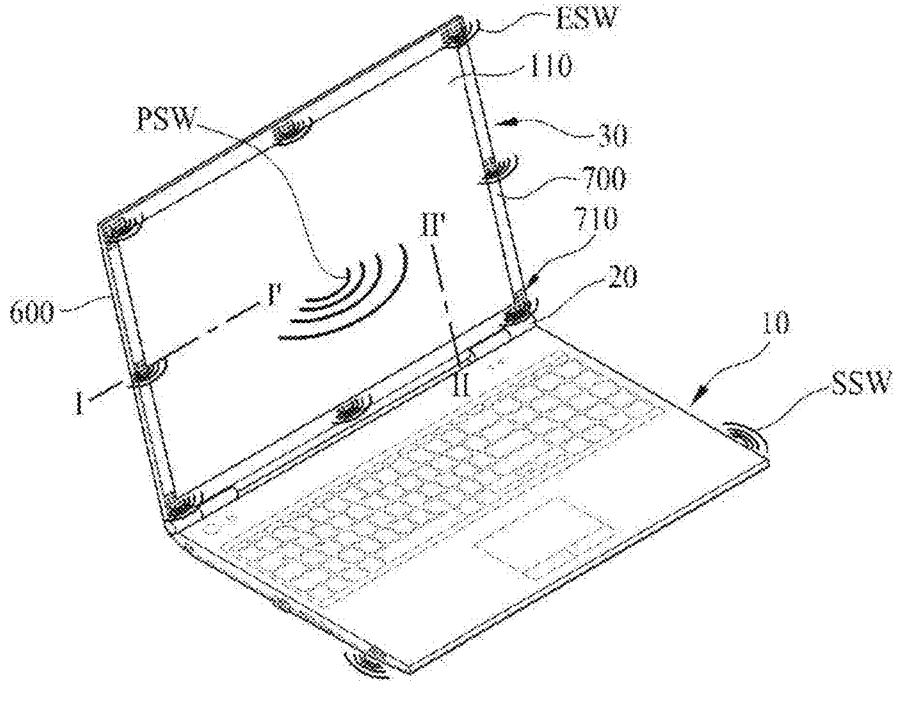
FIG. 14 illustrates a computing apparatus according to another embodiment of the present disclosure.

FIG. 14 illustrates a computing apparatus according to another embodiment of the present disclosure.

With reference to FIG. 14, the computing apparatus according to another embodiment of the present disclosure may include the computing apparatus according to an embodiment of the present disclosure illustrated in any of the examples of FIGS. 1 to 13, and may include an embedded speaker equipped in a system body 10. A cross-sectional surface taken along line I-I' illustrated in FIG. 14 is illustrated in each of the examples of FIGS. 3 and 5 to 7, and a cross-sectional surface taken along line II-II' illustrated in FIG. 14 is illustrated in the example of FIG. 4.

Therefore, a computing apparatus according to another embodiment of the present disclosure may realize a stereo sound using a speaker sound SSW that may be output to a region next to a side of the system body by the embedded speaker equipped in the system body 10, a panel sound PSW that may be directly output toward a forward region in front of the display panel 110 based on a vibration of the display panel 110, which may be performed based on a vibration of each of a vibration module and a vibration plate, and an edge or periphery sound ESW that may be output toward the forward region in front of the display panel 110 through a border gap based on the vibration of the vibration plate.

Figure 15:
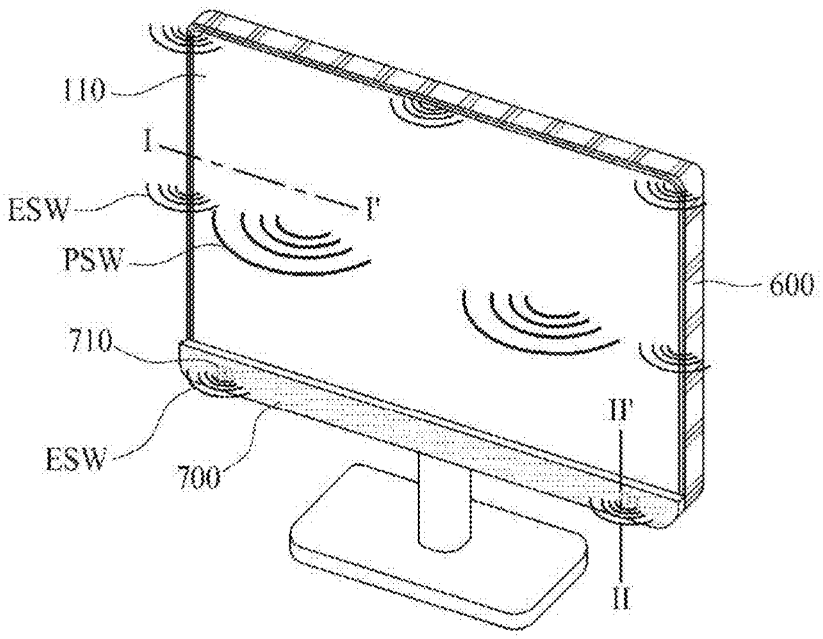
FIG. 15 illustrates a display apparatus according to an embodiment of the present disclosure.

FIG. 15 illustrates a display apparatus according to an embodiment of the present disclosure.

In the computing apparatuses according to an embodiment of the present disclosure illustrated in any of the examples of FIGS. 1 to 14, the display apparatus 30 may be used as a display apparatus, such as a television (TV) and a monitor illustrated in FIG. 15, and moreover, may be used as a display apparatus, such as a navigation device, an electronic pad, or a tablet computer. A cross-sectional surface taken along line I-I' illustrated in FIG. 15 is illustrated in each of the examples of FIGS. 3 and 5 to 7, and a cross-sectional surface taken along line II-II' illustrated in FIG. 15 is illustrated in the example of FIG. 4. The display apparatus according to an embodiment of the present disclosure illustrated in FIG. 15 may realize a stereo sound using a panel sound PSW that may be directly output toward a forward region in front of the display panel 110 based on a vibration of the display panel 110, which may be performed based on a vibration of each of a vibration module and a vibration plate, and an edge or periphery sound ESW that may be output toward the forward region in front portion of the display panel 110 through a border gap based on the vibration of the vibration plate.

Figure 16:
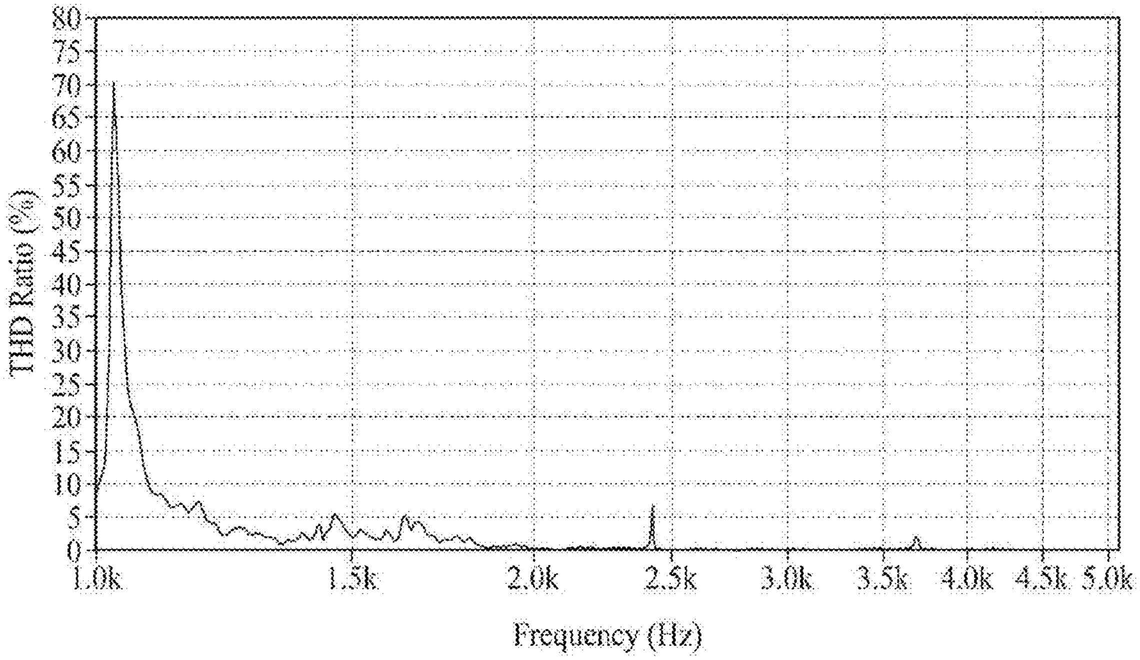
FIG. 16 is a graph showing experimental results of a total harmonic distortion characteristic of a display apparatus according to a comparative example.
Figure 17:
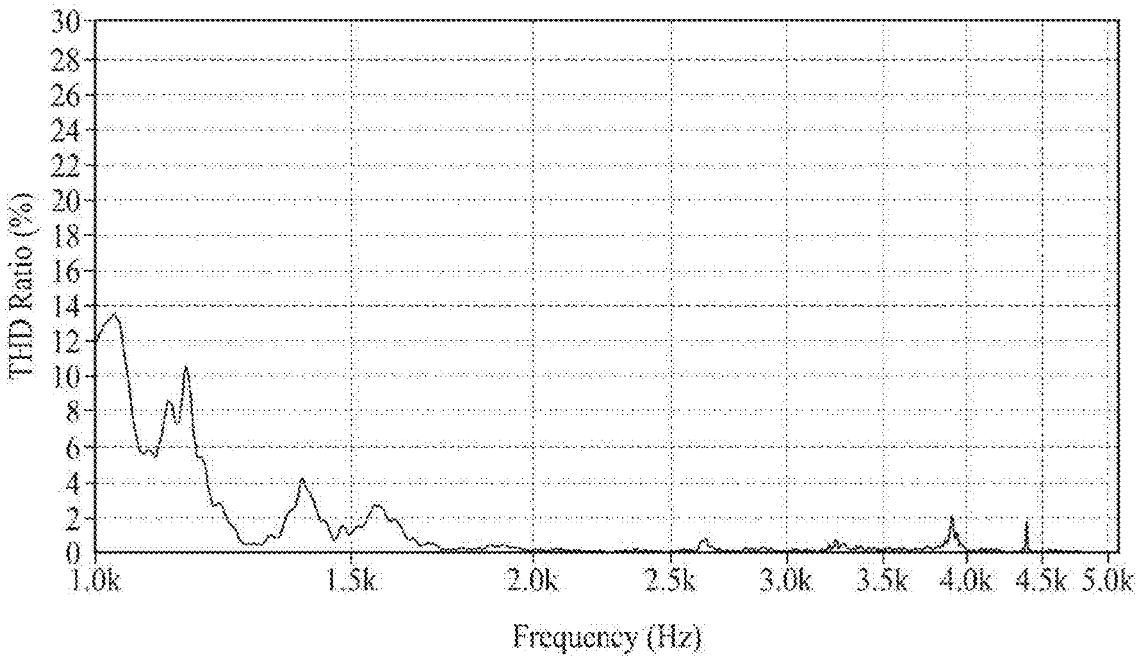
FIG. 17 is a graph showing experimental results of a total harmonic distortion characteristic of a display apparatus including an enclosure according to a first embodiment of the present disclosure.
Figure 18:
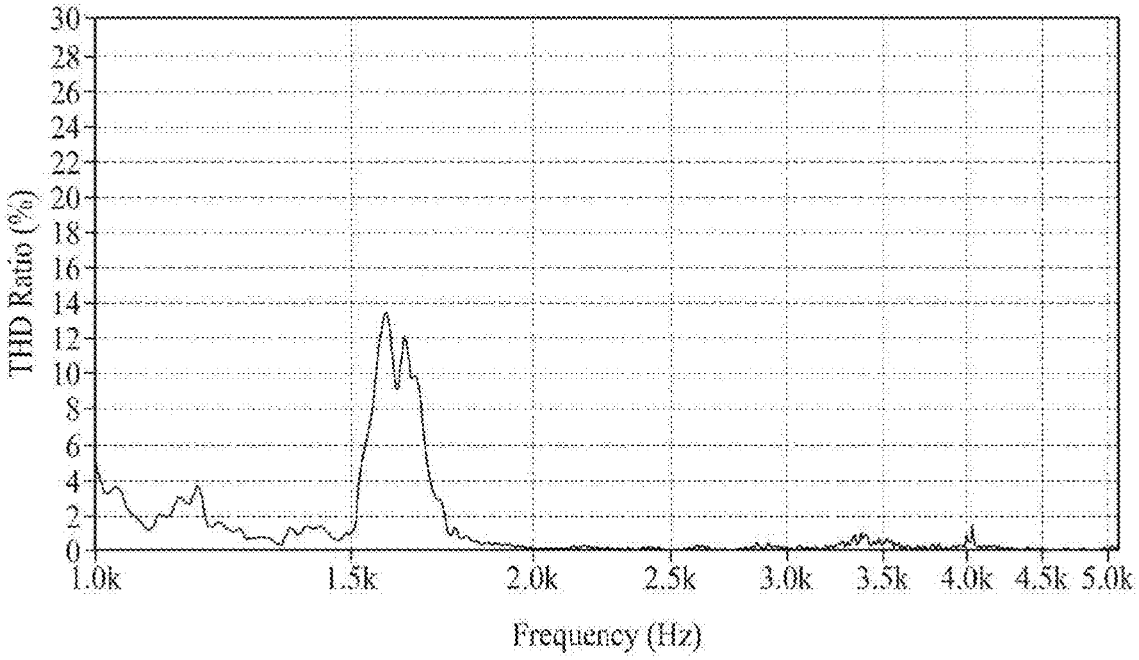
FIG. 18 is a graph showing experimental results of a total harmonic distortion characteristic of a display apparatus including an enclosure according to a second embodiment of the present disclosure.
Figure 19:
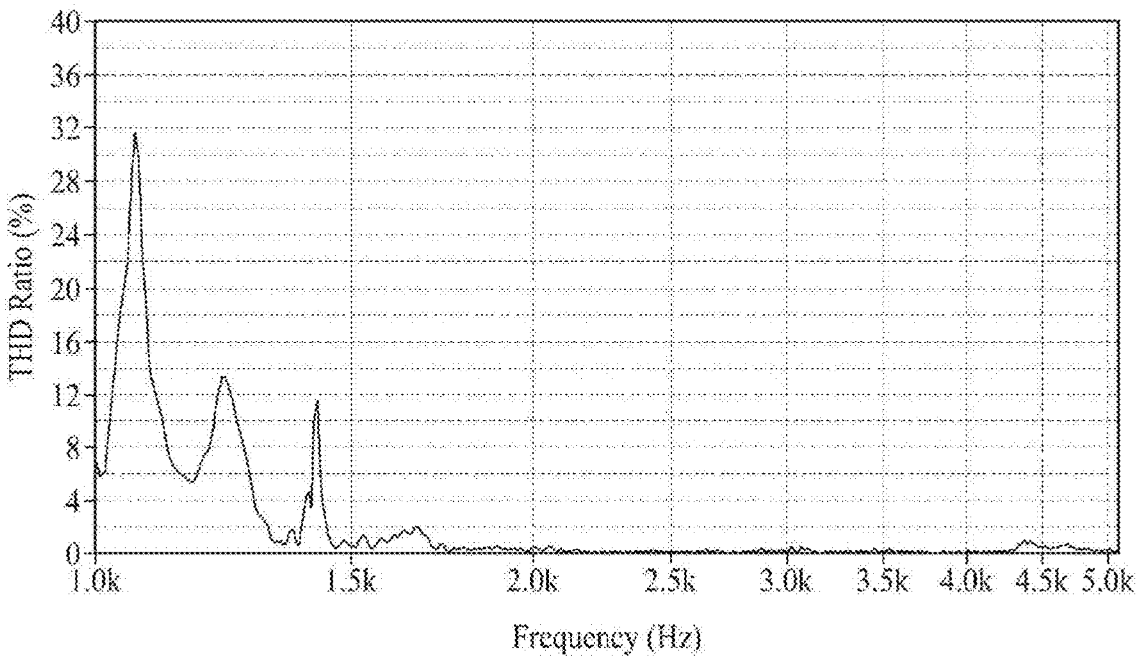
FIG. 19 is a graph showing experimental results of a total harmonic distortion characteristic of a display apparatus including an enclosure according to a third embodiment of the present disclosure.
Figure 20:
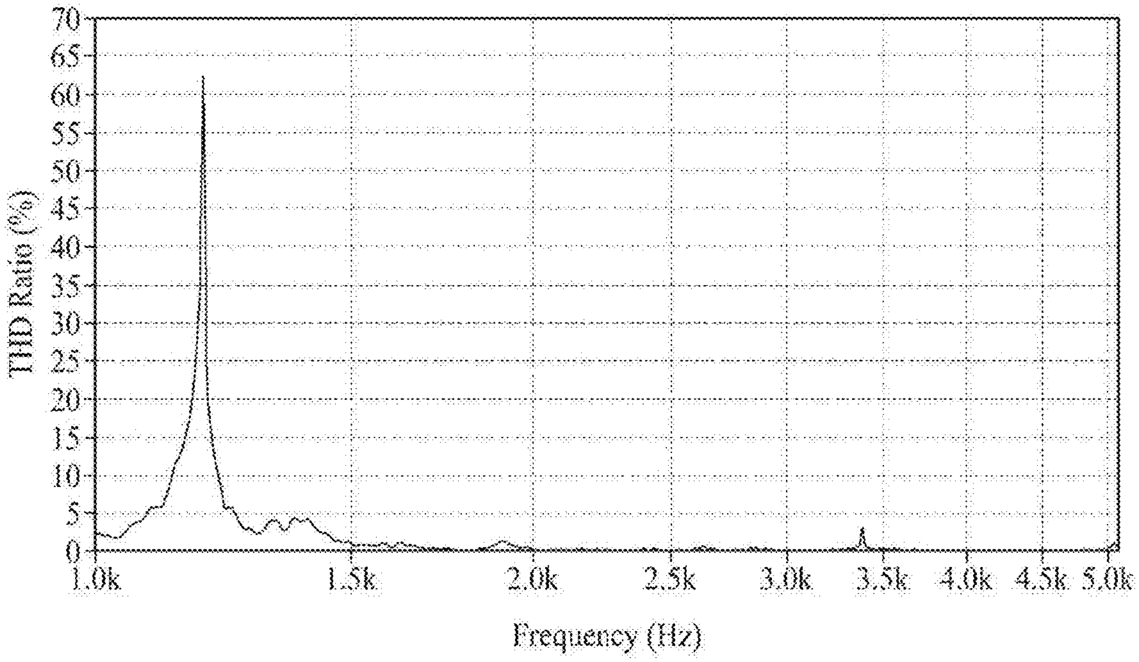
FIG. 20 is a graph showing experimental results of a total harmonic distortion characteristic of a display apparatus including an enclosure according to a fourth embodiment of the present disclosure.
Figure 21:
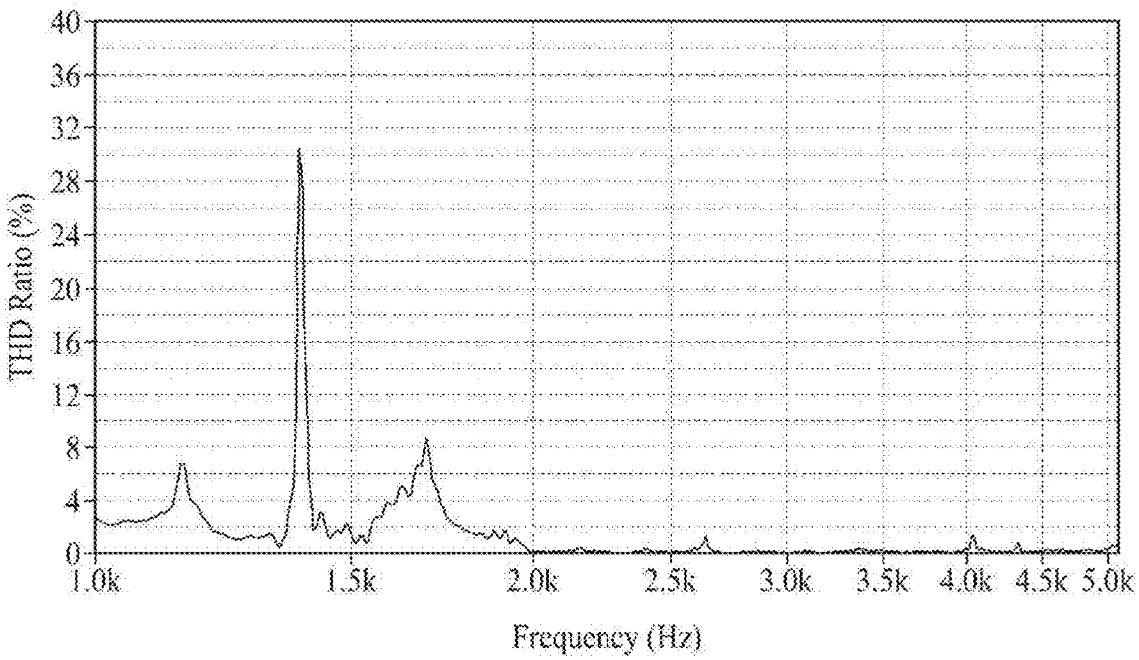
FIG. 21 is a graph showing experimental results of a total harmonic distortion characteristic of a display apparatus including an enclosure according to a fifth embodiment of the present disclosure.
Figure 22:
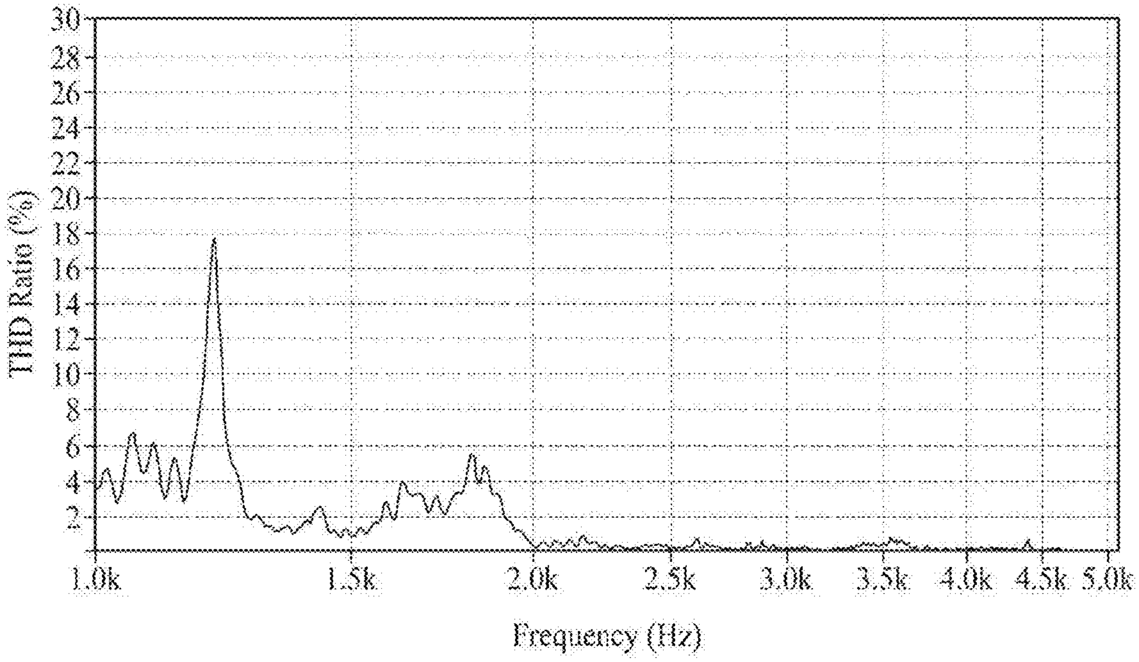
FIG. 22 is a graph showing experimental results of a total harmonic distortion characteristic of a display apparatus including an enclosure according to a sixth embodiment of the present disclosure.

FIG. 16 is a graph showing experimental results of a total harmonic distortion characteristic of a display apparatus according to a comparative example. FIG. 17 is a graph showing experimental results of a total harmonic distortion characteristic of a display apparatus including an enclosure according to a first embodiment of the present disclosure. FIG. 18 is a graph showing experimental results of a total harmonic distortion characteristic of a display apparatus including an enclosure according to a second embodiment of the present disclosure. FIG. 19 is a graph showing experimental results of a total harmonic distortion characteristic of a display apparatus including an enclosure according to a third embodiment of the present disclosure. FIG. 20 is a graph showing experimental results of a total harmonic distortion characteristic of a display apparatus including an enclosure according to a fourth embodiment of the present disclosure. FIG. 21 is a graph showing experimental results of a total harmonic distortion characteristic of a display apparatus including an enclosure according to a fifth embodiment of the present disclosure. FIG. 22 is a graph showing experimental results of a total harmonic distortion characteristic of a display apparatus including an enclosure according to a sixth embodiment of the present disclosure.

FIGS. 17 to 22 are graphs showing experimental results of a total harmonic distortion characteristic of a display apparatus including an enclosure according to each of the first to sixth embodiments of the present disclosure. The display apparatus according to the comparative example has a structure in which an enclosure is not provided near a vibration module. In FIGS. 16 to 23, the abscissa axis (e.g., x-axis) represents a frequency (Hz), and the ordinate axis (e.g., y-axis) represents a total harmonic distortion (THD) ratio (%).

With reference to FIG. 16, in the display apparatus according to the comparative example, it may be seen that a THD characteristic of 70.39% is shown in a sound band (or a sound frequency) of about 1.03 kHz, a THD characteristic of 7.02% is shown in a sound band of about 2.42 kHz, and a THD characteristic of 5% is intermittently shown in a sound band of about 1.15 kHz to about 2 kHz. Therefore, the sound pressure characteristic and sound quality of the display apparatus according to the comparative example is reduced due to a THD characteristic in each of a sound band of about 1.5 kHz or less and in a sound band of about 2 kHz to 2.5 kHz.

With reference to FIG. 17, in the display apparatus (hereinafter referred to as a first embodiment of the present disclosure) including the enclosure according to the first embodiment of the present disclosure, it may be seen that a primary THD characteristic of 13.52% is shown in a sound band of about 1.04 kHz, a secondary THD characteristic of 10.60% is shown in a sound band of 1.16 kHz, a tertiary THD characteristic of 4.2% is shown in a sound band of 1.4 kHz, and a THD characteristic of 3% or 2% is intermittently shown in a sound band of about 1.5 kHz or more. Therefore, in comparison with the comparative example, it may be seen that, in the first embodiment of the present disclosure, a THD characteristic is reduced in a full sound band. Thus, a sound pressure characteristic and sound quality are enhanced.

With reference to FIG. 18, in the display apparatus (hereinafter referred to as a second embodiment of the present disclosure) including the enclosure according to the second embodiment of the present disclosure, it may be seen that a primary THD characteristic of 13.42% is shown in a sound band of 1.58 kHz, a secondary THD characteristic of 12.04% is shown in a sound band of 1.63 kHz, a THD characteristic of 4% is shown in a sound band of about 1.5 kHz or less, and a THD characteristic of 2% or less is shown in a sound band of about 1.8 kHz or more. Therefore, in comparison with the comparative example, it may be seen that, in the second embodiment of the present disclosure, a THD characteristic is reduced in a full sound band. Thus, a sound pressure characteristic and sound quality are enhanced. Also, in comparison with the first embodiment of the present disclosure, it may be seen that the second embodiment of the present disclosure has a relatively high THD characteristic in a sound band of about 1.5 kHz to 1.8 kHz, and has a relatively low THD characteristic in a sound band other than the sound band of about 1.5 kHz to 1.8 kHz. Accordingly, the second embodiment of the present disclosure may be applied.

With reference to FIG. 19, in the display apparatus (hereinafter referred to as a third embodiment of the present disclosure) including the enclosure according to the third embodiment of the present disclosure, it may be seen that a primary THD characteristic of 37.79% is shown in a sound band of 1.06 kHz, a secondary THD characteristic of 13.37% is shown in a sound band of 1.22 kHz, a tertiary THD characteristic of 11.5% is shown in a sound band of 1.43 kHz, and a THD characteristic of 2% or less is intermittently shown in a sound band of about 1.5 kHz or more. Therefore, in comparison with the comparative example, it may be seen that, in the third embodiment of the present disclosure, a THD characteristic is reduced in a full sound band. Thus, a sound pressure characteristic and sound quality are enhanced. Also, in comparison with the first embodiment of the present disclosure, it may be seen that the third embodiment of the present disclosure has a relatively high THD characteristic in a sound band of about 1.5 kHz or less, and has a relatively low THD characteristic in a sound band of about 1.5 kHz or more. Accordingly, the third embodiment of the present disclosure may be applied.

With reference to FIG. 20, in the display apparatus (hereinafter referred to as a fourth embodiment of the present disclosure) including the enclosure according to the fourth embodiment of the present disclosure, it may be seen that a primary THD characteristic of 62.17% is shown in a sound band of 1.18 kHz, a secondary THD characteristic of 4.39% is shown in a sound band of 1.4 kHz, and a THD characteristic of 2.5% or less is intermittently shown in a sound band of about 1.5 kHz or more. Therefore, in comparison with the comparative example, it may be seen that, in the fourth embodiment of the present disclosure, a THD characteristic is reduced in a full sound band. Thus, a sound pressure characteristic and sound quality are enhanced. Also, in comparison with the first embodiment of the present disclosure, it may be seen that the fourth embodiment of the present disclosure has a relatively high THD characteristic in a sound band of about 1.5 kHz or less, has a similar THD characteristic in a sound band of about 1.5 kHz to 3.5 kHz, and has a relatively low THD characteristic in a sound band of 3.5 kHz or more. Accordingly, the fourth embodiment of the present disclosure may be applied.

With reference to FIG. 21, in the display apparatus (hereinafter referred to as a fifth embodiment of the present disclosure) including the enclosure according to the fifth embodiment of the present disclosure, it may be seen that a primary THD characteristic of 30.70% is shown in a sound band of 1.38 kHz, a secondary THD characteristic of 8.81% is shown in a sound band of 1.69 kHz, a tertiary THD characteristic of 6.8% is shown in a sound band of 1.17 kHz, and a THD characteristic of 2% or less is intermittently shown in a sound band of about 2 kHz or more. Therefore, in comparison with the comparative example, it may be seen that, in the fifth embodiment of the present disclosure, a THD characteristic is reduced in a full sound band. Thus, a sound pressure characteristic and sound quality are enhanced. Also, in comparison with the first embodiment of the present disclosure, it may be seen that the fifth embodiment of the present disclosure has a relatively high THD characteristic in a sound band of a sound band of 1.38 kHz and in a sound band of 1.69 kHz, and has a similar THD characteristic and a relatively low THD characteristic in a sound band other than the sound band of 1.38 kHz and the sound band of 1.69 kHz. Accordingly, the fifth embodiment of the present disclosure may be applied.

With reference to FIG. 22, in the display apparatus (hereinafter referred to as a sixth embodiment of the present disclosure) including the enclosure according to the sixth embodiment of the present disclosure, it may be seen that a primary THD characteristic of 17.73% is shown in a sound band of 1.20 kHz, a secondary THD characteristic of 5.39% is shown in a sound band of 1.81 kHz, and a THD characteristic of 1% or less is intermittently shown in a sound band of about 2 kHz or more. Therefore, in comparison with the comparative example, it may be seen that, in the fourth embodiment of the present disclosure, a THD characteristic is reduced in a full sound band. Thus, a sound pressure characteristic and sound quality are enhanced. Also, in comparison with the first embodiment of the present disclosure, it may be seen that the sixth embodiment of the present disclosure has a relatively high THD characteristic in a sound band of about 2 kHz or less, and has a relatively low THD characteristic in a sound band of about 2 kHz or more. Accordingly, the sixth embodiment of the present disclosure may be applied.

Figure 23:
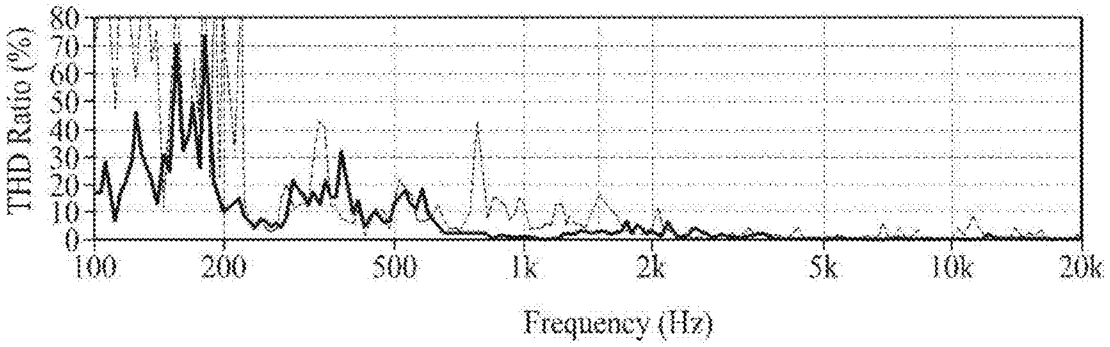
FIG. 23 is a graph showing experimental results of a total harmonic distortion characteristic of a computing apparatus according to a comparative example, and a total harmonic distortion characteristic of a computing apparatus according to an embodiment of the present disclosure.

FIG. 23 is a graph showing experimental results of a total harmonic distortion characteristic of a computing apparatus according to a comparative example, and a total harmonic distortion characteristic of a computing apparatus according to an embodiment of the present disclosure.

In FIG. 23, the abscissa axis (e.g., x-axis) represents a frequency, and the ordinate axis (e.g., y-axis) represents a THD characteristic. The computing apparatus according to the comparative example includes a display apparatus in which an enclosure is not provided near a vibration module. The computing apparatus according to an embodiment of the present disclosure includes the display apparatus including the enclosure according to the first embodiment of the present disclosure.

As illustrated in a dotted-line graph shown in FIG. 23, it may be seen that, in the computing apparatus according to the comparative example, a THD characteristic of 18% is shown in a sound band of about 1 kHz to 2 kHz, and a THD characteristic of 5% to 10% is intermittently shown in a sound band of about 2 kHz or more. As illustrated in a solid-line graph shown in FIG. 23, it may be seen that, in the computing apparatus according to an embodiment of the present disclosure, a THD characteristic of 7% is shown in a sound band of about 2 kHz, and a THD characteristic of 5% or less is shown in a sound band of about 2 kHz or more. Also, in comparison with the comparative example, it may be seen that, in the computing apparatus according to an embodiment of the present disclosure, a relatively low THD characteristic is shown in a sound band of 1 kHz or less.

Therefore, the computing apparatus according to an embodiment of the present disclosure may include the enclosure near the vibration module. Thus, in comparison with the comparative example, a THD characteristic of the computing apparatus according to an embodiment of the present disclosure may be reduced in a full sound band.

Figure 24:
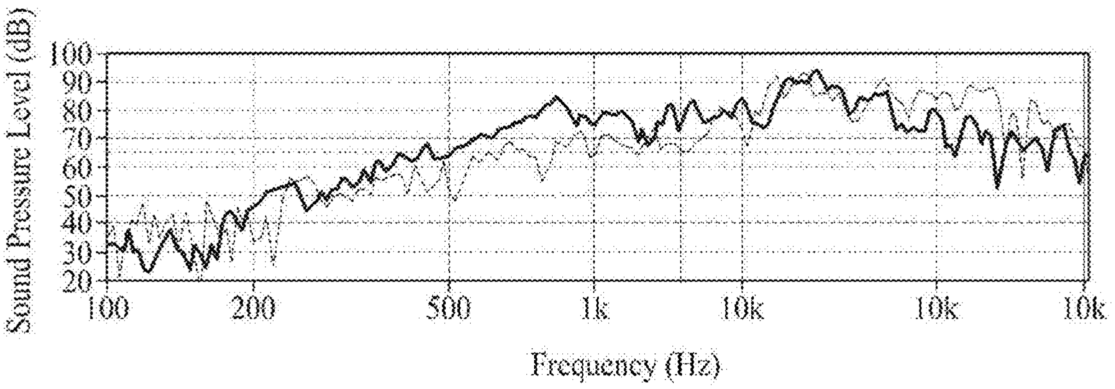
FIG. 24 is a graph showing experimental results of a sound pressure characteristic of a computing apparatus according to a comparative example, and a sound pressure characteristic of a computing apparatus according to an embodiment of the present disclosure.

FIG. 24 is a graph showing experimental results of a sound pressure characteristic of a computing apparatus according to a comparative example, and a sound pressure characteristic of a computing apparatus according to an embodiment of the present disclosure.

In FIG. 24, the abscissa axis (e.g., x-axis) represents a frequency (Hz), and the ordinate axis (e.g., y-axis) represents a sound pressure level (dB). Also, in FIG. 24, a dotted-line graph represents a sound pressure characteristic of the computing apparatus according to the comparative example, and a thick-solid-line graph represents a sound pressure characteristic of the computing apparatus according to an embodiment of the present disclosure.

As illustrated in FIG. 24, in comparison with the computing apparatus according to the comparative example, it may be seen that, in the computing apparatus according to an embodiment of the present disclosure, a THD characteristic is improved in a full sound band as shown in FIG. 23. Thus, a sound pressure characteristic is enhanced. For example, in comparison with the computing apparatus according to the comparative example, it may be seen that, in the computing apparatus according to an embodiment of the present disclosure, a sound pressure characteristic in a sound band of 1 kHz increases by 8 dB to 9 dB.

Therefore, the computing apparatus according to an embodiment of the present disclosure may include the enclosure disposed near the vibration module. Thus, in comparison with the comparative example, a THD characteristic of the computing apparatus according to an embodiment of the present disclosure may be reduced in a full sound band, and the sound pressure characteristic and sound quality of the computing apparatus according to an embodiment of the present disclosure may be enhanced.

The display apparatus and the computing apparatus including the same according to an embodiment of the present disclosure may be applied to desktop personal computers (PCs), laptop PCs, netbook computers, workstations, navigation apparatuses, automotive navigation apparatuses, automotive display apparatuses, TVs, wall paper display apparatuses, signage apparatuses, game machines, notebook computers, monitors, cameras, camcorders, home appliances, etc.

The display apparatus and the computing apparatus including the same according to an embodiment of the present disclosure may vibrate the display module to output a sound toward a forward region in front of the display panel. Thus, the display apparatus and the computing apparatus including the same may output a high-quality sound of a broad sound band, may realize a sound field that may fully fill a whole screen, and may enhance an immersion experience of a viewer due to harmony (or match) between an image and a sound. The display apparatus and the computing apparatus including the same according to the present disclosure may thus improve a sound characteristic of a low-pitched sound band and/or a high-pitched sound band.

Moreover, when the display apparatus and the computing apparatus including the same according to the present disclosure each include the enclosure for preventing (or attenuating) a horizontal vibration of the vibration plate, the total harmonic distortion of the vibration plate may be reduced. Thus, sound quality and a sound pressure characteristic may be enhanced.

A display apparatus and a computing apparatus including the same according to an embodiment of the present disclosure the present disclosure will be described below.

According to an embodiment of the present disclosure, a display apparatus may include: a display module including a display panel configured to display an image, a vibration plate on a rear surface of the display module, a connection member between the rear surface of the display module and the vibration plate, at least one vibration module on the vibration plate, and an enclosure between the rear surface of the display module and the vibration plate, the enclosure being spaced apart from the at least one vibration module, the enclosure surrounding the at least one vibration module.

For example, in the display apparatus according to an embodiment of the present disclosure, the connection member may surround the enclosure. For example, the display apparatus according to an embodiment of the present disclosure may further include a first air gap between the display module and the vibration plate, the first air gap including at least one second air gap surrounding the at least one vibration module.

For example, in the display apparatus according to an embodiment of the present disclosure, the enclosure may include one or more of: a double-sided adhesive tape, a double-sided adhesive pad, and a double-sided foam pad. For example, in the display apparatus according to an embodiment of the present disclosure, the at least one vibration module may include a vibration-generating device attached to or provided on the vibration plate by an adhesive member, the vibration-generating device may include: a pair of first sides parallel to a first direction, each having a first length, and a pair of second sides parallel to a second direction intersecting the first direction, each having a second length, and a first distance between the enclosure and each of the pair of second sides of the vibration-generating device may be one to three times the first length, with respect to the first direction.

For example, in the display apparatus according to an embodiment of the present disclosure, a second distance between the enclosure and each of the pair of first sides of the vibration-generating device may be 0.5 to 1.5 times the second length, with respect to the second direction. For example, in the display apparatus according to an embodiment of the present disclosure, in the vibration-generating device, the first length may be shorter than the second length.

For example, in the display apparatus according to an embodiment of the present disclosure, the enclosure may include: a first enclosing member spaced apart from the vibration-generating device, and in parallel with the first direction, a second enclosing member in parallel with the first enclosing member, with the vibration-generating device therebetween, a third enclosing member spaced apart from the vibration-generating device, and in parallel with the second direction, and a fourth enclosing member in parallel with the third enclosing member, with the vibration-generating device therebetween. For example, in the display apparatus according to an embodiment of the present disclosure, the vibration-generating device may include a piezoelectric material layer.

For example, the display apparatus according to an embodiment of the present disclosure may further include a protection member on the rear surface of the display module, facing the at least one vibration module. For example, the display apparatus according to an embodiment of the present disclosure may further include a protection member on the at least one vibration module.

For example, in the display apparatus according to an embodiment of the present disclosure, the display module may include: a panel guide configured to support the display panel, a backlight unit on the rear surface of the display panel, and a supporting cover configured to: support the panel guide, and accommodate the backlight unit, the vibration plate may be on a rear surface of the supporting cover, and each of the connection member and the enclosure may be between the rear surface of the supporting cover and the vibration plate. For example, the display apparatus according to an embodiment of the present disclosure may further include a protection member on the rear surface of the supporting cover, facing the at least one vibration module. For example, in the display apparatus according to an embodiment of the present disclosure, the supporting cover may include an opening facing the at least one vibration module, and a size of the opening may be wider than a size of the at least one vibration module.

For example, in the display apparatus according to an embodiment of the present disclosure, the display panel may include a plurality of pixels, each including a respective light-emitting device, the vibration plate may be on the rear surface of the display panel, and each of the connection member and the enclosure may be between the rear surface of the supporting cover and the vibration plate. For example, the display apparatus according to an embodiment of the present disclosure may further include a system rear cover on a rear surface of the vibration plate with a third air gap therebetween, the system rear cover including: a rear structure covering the rear surface of the vibration plate, and a side structure surrounding a side surface of the display module, with a border gap therebetween.

For example, the display apparatus according to an embodiment of the present disclosure may further include a system front cover covering a periphery of a front surface of the display module and the border gap, the system front cover including at least one sound emission part overlapping the border gap. For example, in the display apparatus according to an embodiment of the present disclosure, the vibration plate may include one or more of: magnesium (Mg), aluminum (Al), an Al alloy material, a Mg alloy material, and a Mg-lithium (Li) alloy material.

According to an embodiment of the present disclosure, a computing apparatus may include: a system body, a display apparatus, including: a display module including a display panel configured to display an image, a vibration plate on a rear surface of the display module, a connection member between the rear surface of the display module and the vibration plate, a vibration module on the vibration plate, and an enclosure between the rear surface of the display module and the vibration plate, the enclosure being spaced apart from the vibration module, the enclosure surrounding the vibration module, and a hinge part between the system body and the display apparatus, the hinge part being configured to rotatably support the display apparatus. For example, the computing apparatus according to an embodiment of the present disclosure may further include an embedded speaker in the system body.

It will be apparent to those skilled in the art that various modifications and variations may be made in the present disclosure without departing from the technical idea or scope of the disclosure. Thus, it may be intended that embodiments of the present disclosure cover the modifications and variations of the disclosure provided they come within the scope of the appended claims and their equivalents.

What is claimed is:

1. An apparatus, comprising:

a vibration plate;

at least one vibration module on the vibration plate and including at least one vibration-generating device; and at least one enclosure surrounding the at least one vibration-generating device on a vibration plate, wherein the at least one vibration-generating device comprises:

a pair of first sides parallel to a first direction, each of the pair of first sides having a first length; and a pair of second sides parallel to a second direction perpendicular to the first direction, each of the pair of second sides having a second length, the second length being longer than the first length, wherein the at least one enclosure comprises:

a pair of first sides parallel to the first direction, each of the pair of first sides of the at least one enclosure having a third length, the third length being longer than the first length; and a pair of second sides parallel to the second direction, each of the pair of second sides of the at least one enclosure having a fourth length, the fourth length being longer than the second length, and wherein a first distance between the at least one vibration-generating device and the enclosure is longer than each the first length and the second length.

2. The apparatus of claim 1, wherein the fourth length is longer than the third length.

3. The apparatus of claim 1, wherein the fourth length is equal to the third length.

4. The apparatus of claim 1, wherein the first distance is shorter than or equal to 3 times the first length.

5. The apparatus of claim 1 wherein a second distance between the at least one vibration-generating device and the enclosure is longer than the first length.

6. The apparatus of claim 1, wherein a second distance between the at least one vibration-generating device and the enclosure is longer than the first length and shorter than or equal to 2.5 times the first length.

7. The apparatus of claim 1, wherein a second distance between the at least one vibration-generating device and the enclosure is longer than the second length.

8. The apparatus of claim 7, wherein the second distance is shorter than or equal to 1.5 times the second length.

9. The apparatus of claim 1, wherein the at least one enclosure comprises one or more of: a double-sided adhesive tape, a double-sided adhesive pad, and a double-sided foam pad.

10. The apparatus of claim 1, wherein the at least one vibration-generating device comprises a piezoelectric material layer.

11. The apparatus of claim 1, wherein the at least one enclosure comprises a first enclosure surrounding the at least one vibration module and a second enclosure surrounding the first enclosure.

12. The apparatus of claim 1, wherein the vibration plate comprises one or more of: magnesium Mg, aluminum Al, an Al alloy material, a Mg alloy material, and a magnesium-lithium Mg—Li alloy material.

13. An apparatus, comprising:

a panel;

a vibration plate facing a rear surface of the panel;

a connection member between the panel and the vibration plate;

at least one vibration-generating device on the vibration plate; and at least one enclosure surrounding the at least one vibration-generating device on the vibration plate; and a protection member on the rear surface of the panel, facing the at least one vibration-generating device or on the surface of the at least one vibration-generating device facing the rear surface of the panel, wherein the at least one vibration-generating device comprises:

a pair of first sides parallel to a first direction, each of the pair of first sides having a first length; and a pair of second sides parallel to a second direction perpendicular to the first direction, each of the pair of second sides having a second length, the second length being longer than the first length, and wherein the at least one enclosure comprises:

a pair of first sides parallel to the first direction, each of the pair of first sides of the at least one enclosure having a third length, the third length being longer than the first length; and a pair of second sides parallel to the second direction, each of the pair of second sides of the at least one enclosure having a fourth length, the fourth length being longer than the second length.

14. The apparatus of claim 13, wherein a first distance between the at least one vibration-generating device and the at least one enclosure is longer than each the first length and the second length.

15. The apparatus of claim 13, wherein a second distance between the at least one vibration-generating device and the at least one enclosure is longer than each the first length and the second length.

16. The apparatus of claim 13, wherein a first distance between the at least one enclosure and the at least one vibration generating device is one to three times the first length.

17. The apparatus of claim 13, wherein a second distance between the at least one enclosure and the at least one vibration generating device is 0.5 to 1.5 times the second length.

18. The apparatus of claim 13, wherein the vibration plate comprises one or more of: magnesium Mg, aluminum Al, an Al alloy material, a Mg alloy material, and a magnesium-lithium Mg—Li alloy material.

19. The apparatus of claim 13, wherein the at least one vibration-generating device comprises a piezoelectric material layer.

20. The apparatus of claim 13, wherein a first air gap is provided between the panel and the vibration plate, and wherein the first air gap includes at least one second air gap surrounding the at least one vibration-generating device, the second air gap being provided between the panel, the vibration plate and the at least one enclosure.

21. The apparatus of claim 20, further comprising:

a system rear cover on a rear surface of the vibration plate, wherein the system rear cover comprising:

a rear structure covering the rear surface of the vibration plate and spaced apart from the rear surface of the vibration plate by a third air gap; and a side structure surrounding side surfaces of the panel and side surfaces of the vibration plate on a periphery of the rear structure and spaced apart from the side surfaces of the panel and the vibration plate by a border gap, the border gap connected to the third air gap.

* * * * *